Nov. 15, 1949     M. D. MARKLEY ET AL     2,487,819
MECHANISM FOR INDICATING THE OPERATIONS OF MACHINES
Filed Oct. 6, 1939     21 Sheets-Sheet 1

INVENTORS.
MYRON D. MARKLEY.
BY JOSEPH M. MARKLEY JR.
Geo. B. Pitts     ATTORNEY.

Nov. 15, 1949     M. D. MARKLEY ET AL     2,487,819
MECHANISM FOR INDICATING THE OPERATIONS OF MACHINES
Filed Oct. 6, 1939     21 Sheets-Sheet 2

INVENTORS.
MYRON D. MARKLEY
JOSEPH M. MARKLEY JR
By
Geo. B. Pitts
ATTORNEY.

Nov. 15, 1949     M. D. MARKLEY ET AL     2,487,819
MECHANISM FOR INDICATING THE OPERATIONS OF MACHINES
Filed Oct. 6, 1939     21 Sheets-Sheet 3

INVENTORS.
MYRON D. MARKLEY.
JOSEPH M. MARKLEY JR.
By Geo. B. Pitts
ATTORNEY.

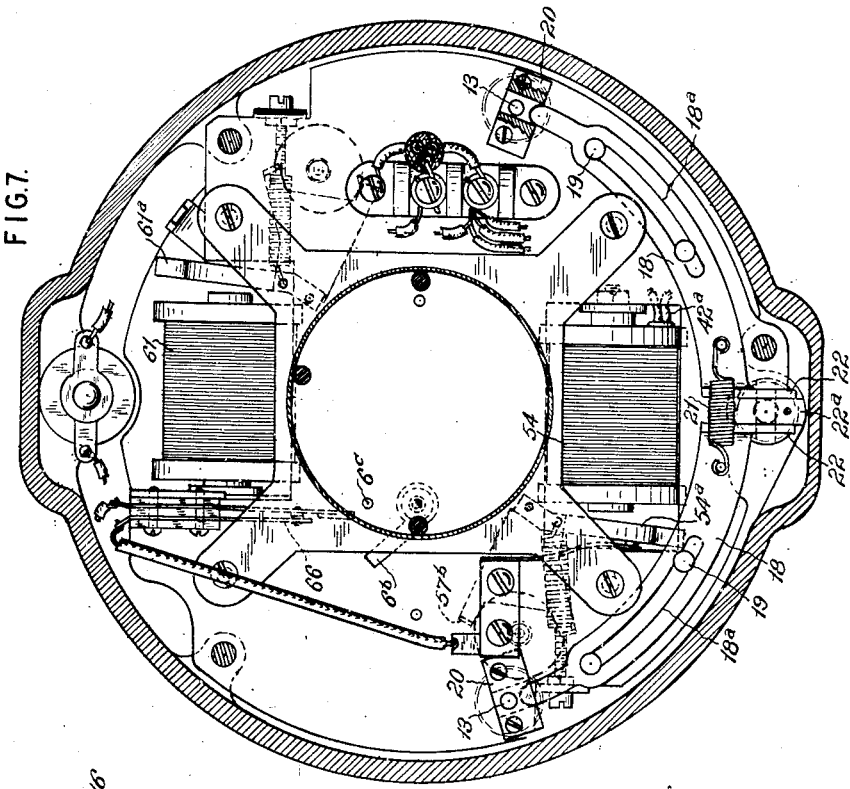

Nov. 15, 1949  M. D. MARKLEY ET AL  2,487,819
MECHANISM FOR INDICATING THE OPERATIONS OF MACHINES
Filed Oct. 6, 1939  21 Sheets-Sheet 5
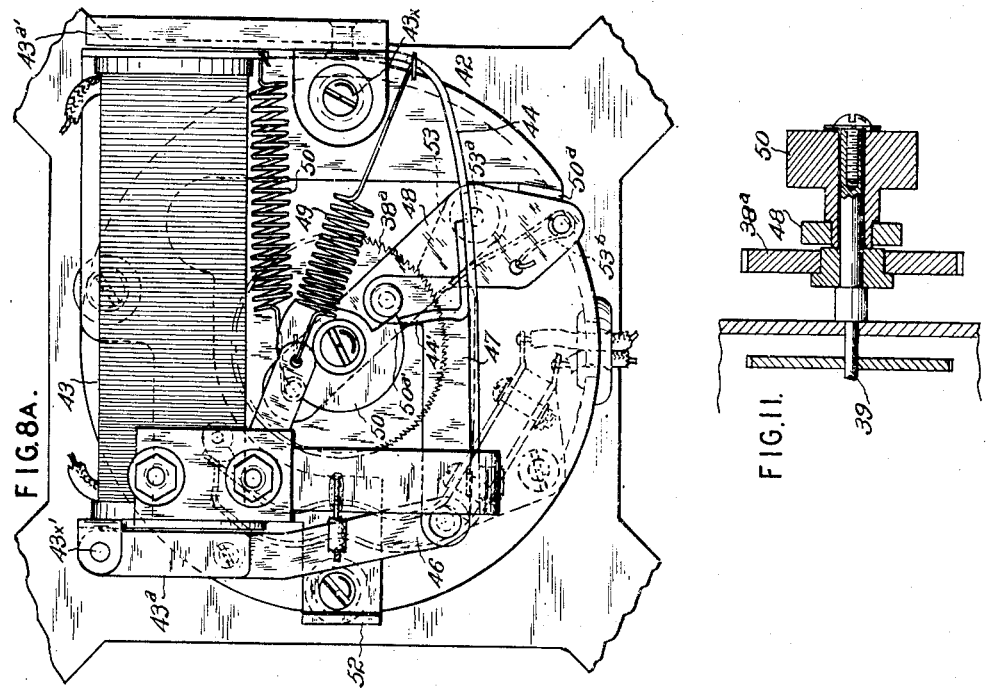
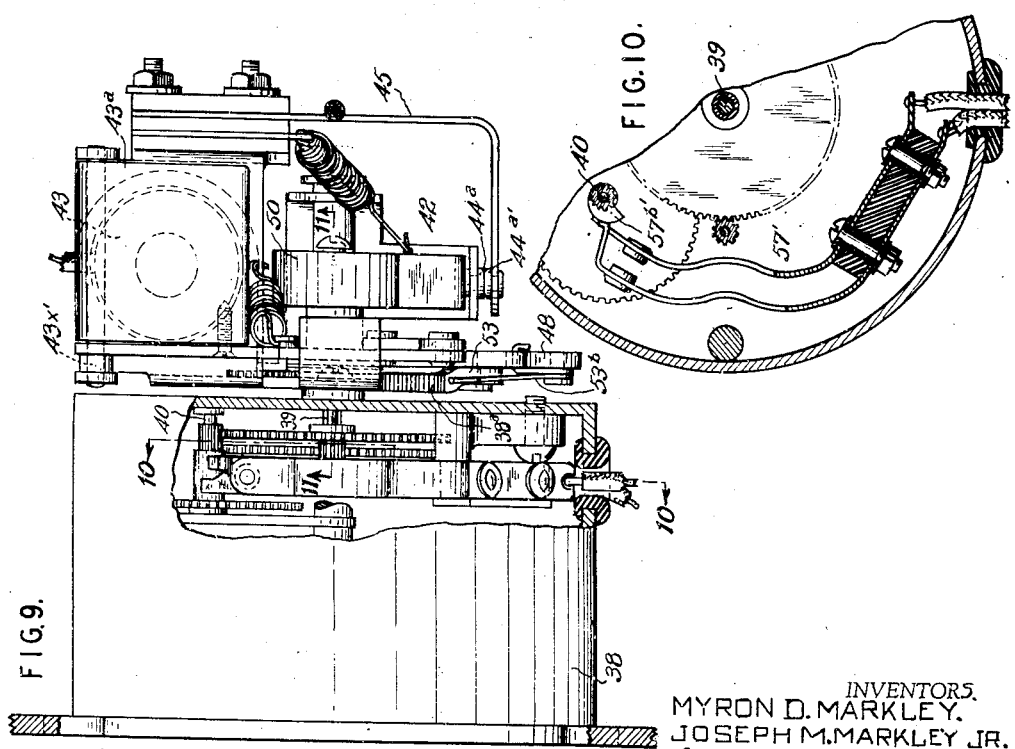
INVENTORS.
MYRON D. MARKLEY.
JOSEPH M. MARKLEY JR.
By Geo. B. Pitts
ATTORNEY.

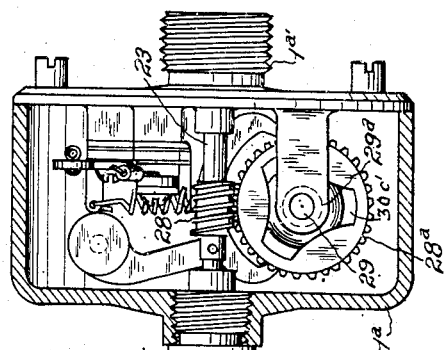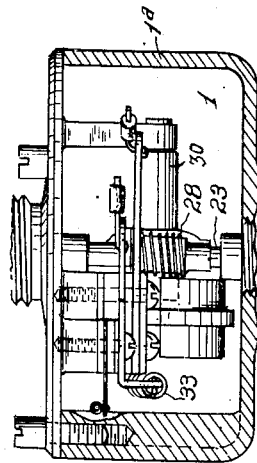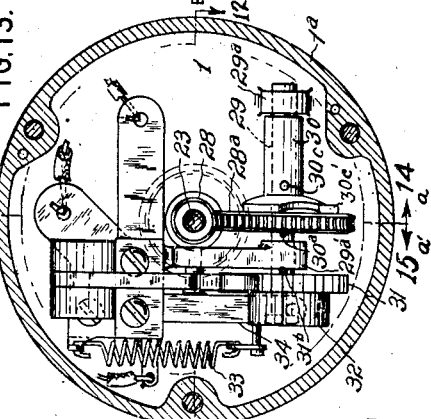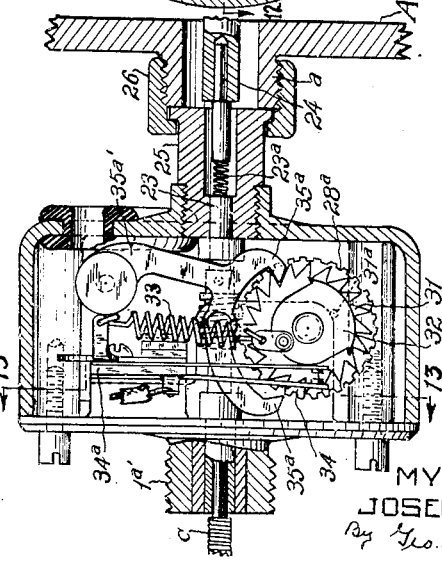

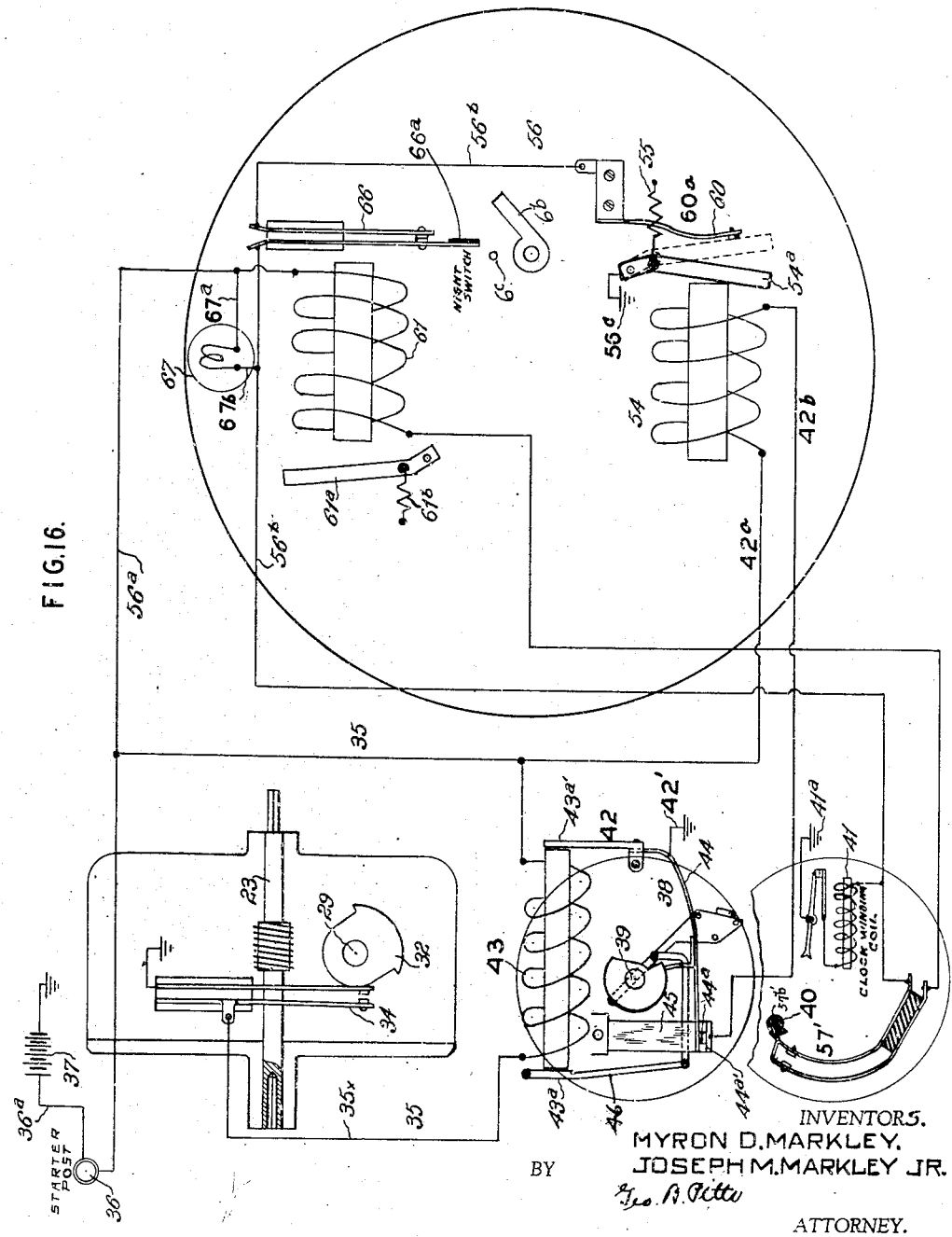

Nov. 15, 1949 — M. D. MARKLEY ET AL — 2,487,819
MECHANISM FOR INDICATING THE OPERATIONS OF MACHINES
Filed Oct. 6, 1939 — 21 Sheets-Sheet 8
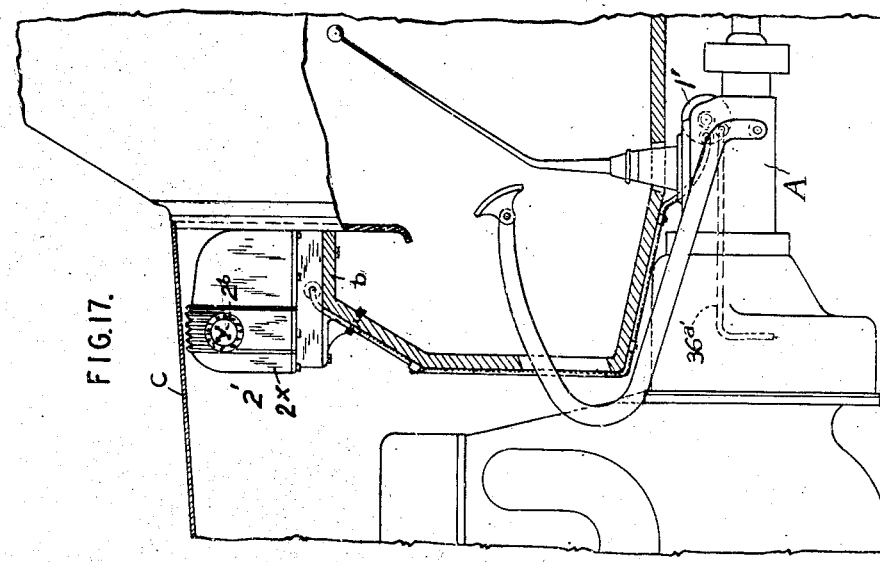
FIG.17.
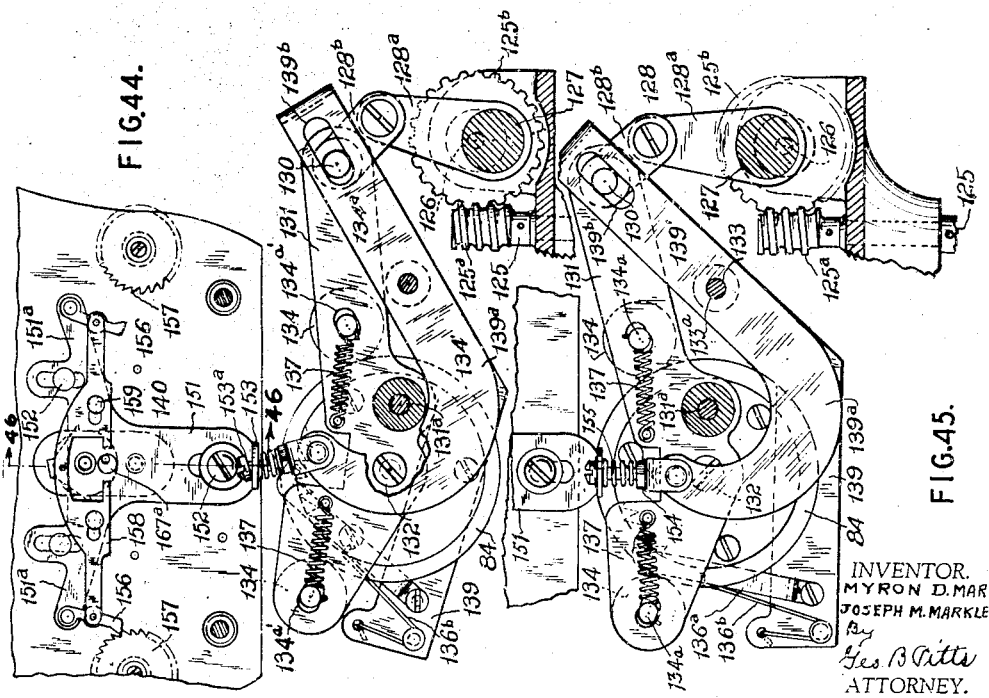
FIG.44.
FIG.45.
INVENTOR.
MYRON D. MARKLEY
JOSEPH M. MARKLEY, JR.
By Geo. B. Pitts
ATTORNEY.

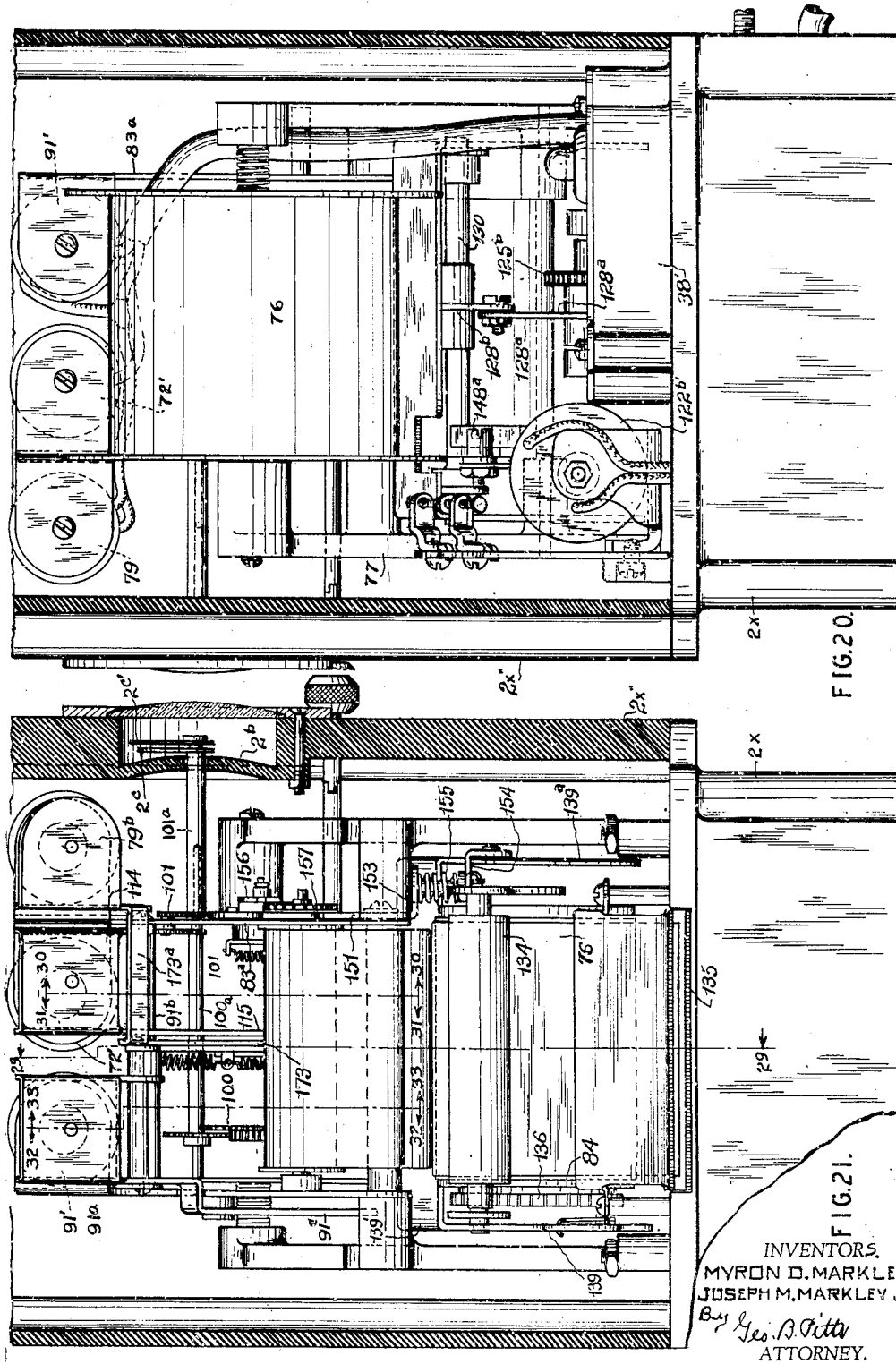

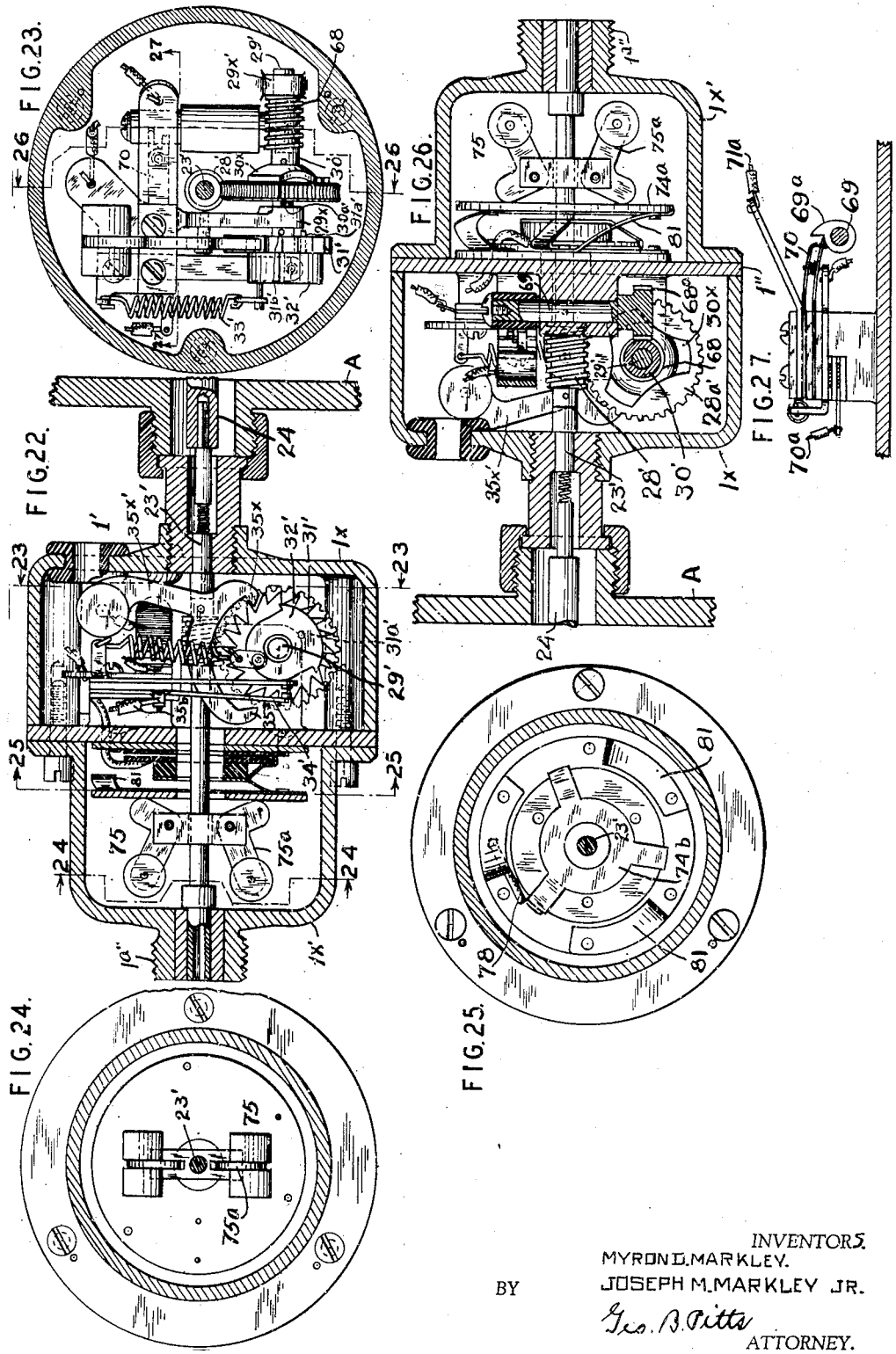

Nov. 15, 1949     M. D. MARKLEY ET AL     2,487,819
MECHANISM FOR INDICATING THE OPERATIONS OF MACHINES
Filed Oct. 6, 1939     21 Sheets-Sheet 13

INVENTORS.
MYRON D. MARKLEY
JOSEPH M. MARKLEY JR.
BY Geo. B. Pitts
ATTORNEY.

Nov. 15, 1949     M. D. MARKLEY ET AL     2,487,819
MECHANISM FOR INDICATING THE OPERATIONS OF MACHINES
Filed Oct. 6, 1939     21 Sheets-Sheet 15

INVENTORS.
MYRON D. MARKLEY.
JOSEPH M. MARKLEY JR.
BY
Geo. B. Pitts
ATTORNEY.

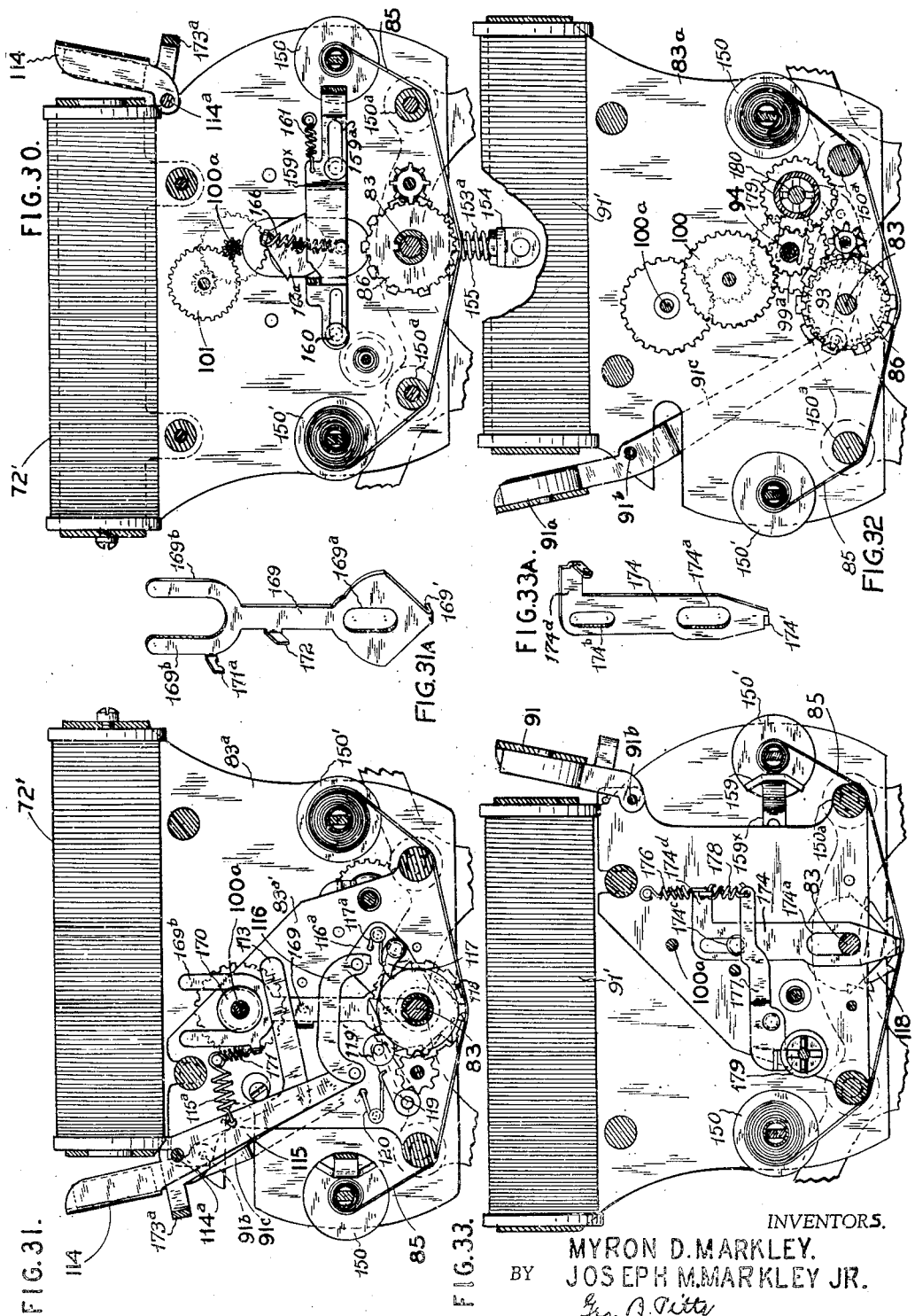

Nov. 15, 1949    M. D. MARKLEY ET AL    2,487,819
MECHANISM FOR INDICATING THE OPERATIONS OF MACHINES
Filed Oct. 6, 1939    21 Sheets-Sheet 17

INVENTORS.
MYRON D. MARKLEY,
BY JOSEPH M. MARKLEY JR.
Geo. B. Pitts
ATTORNEY.

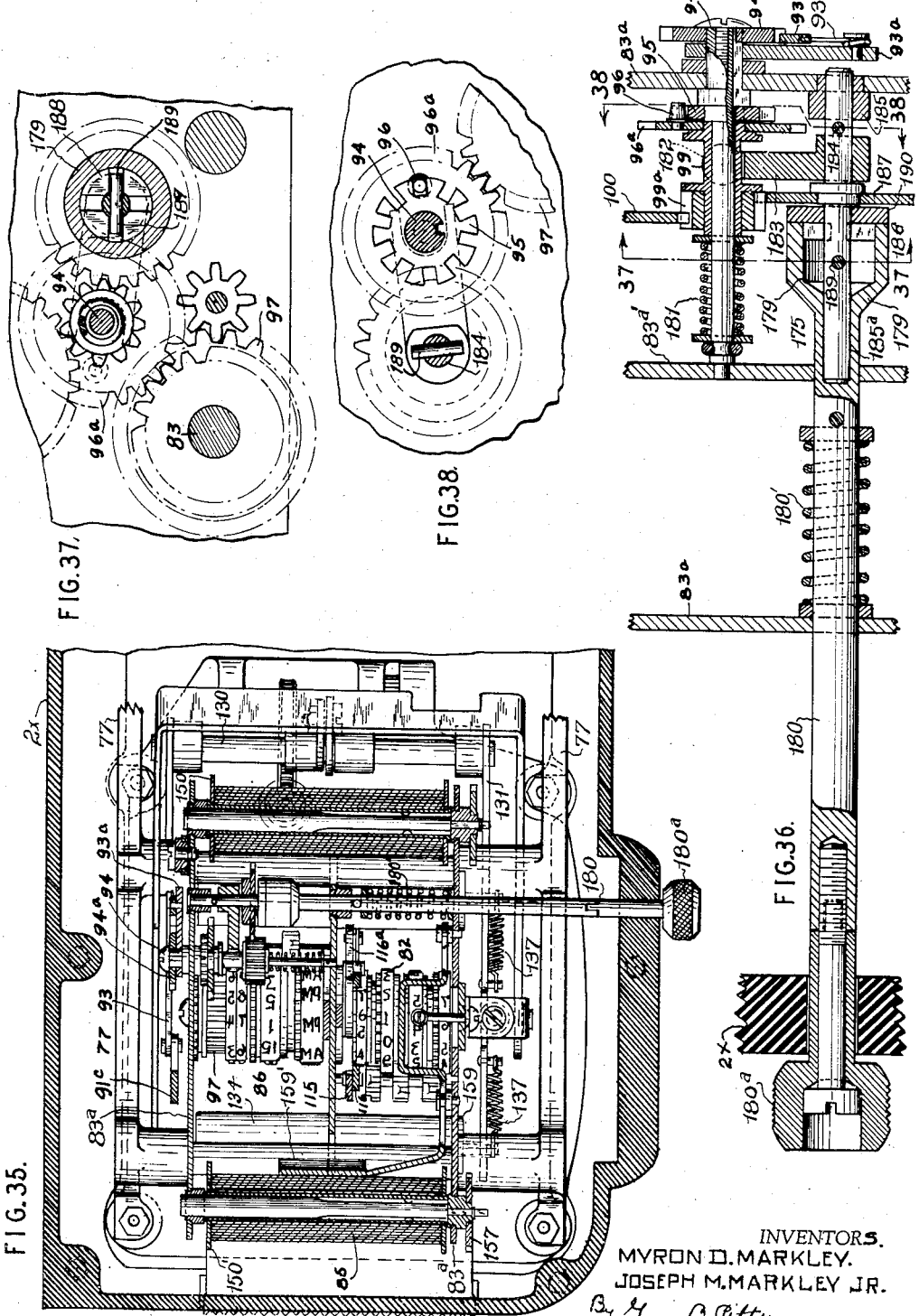

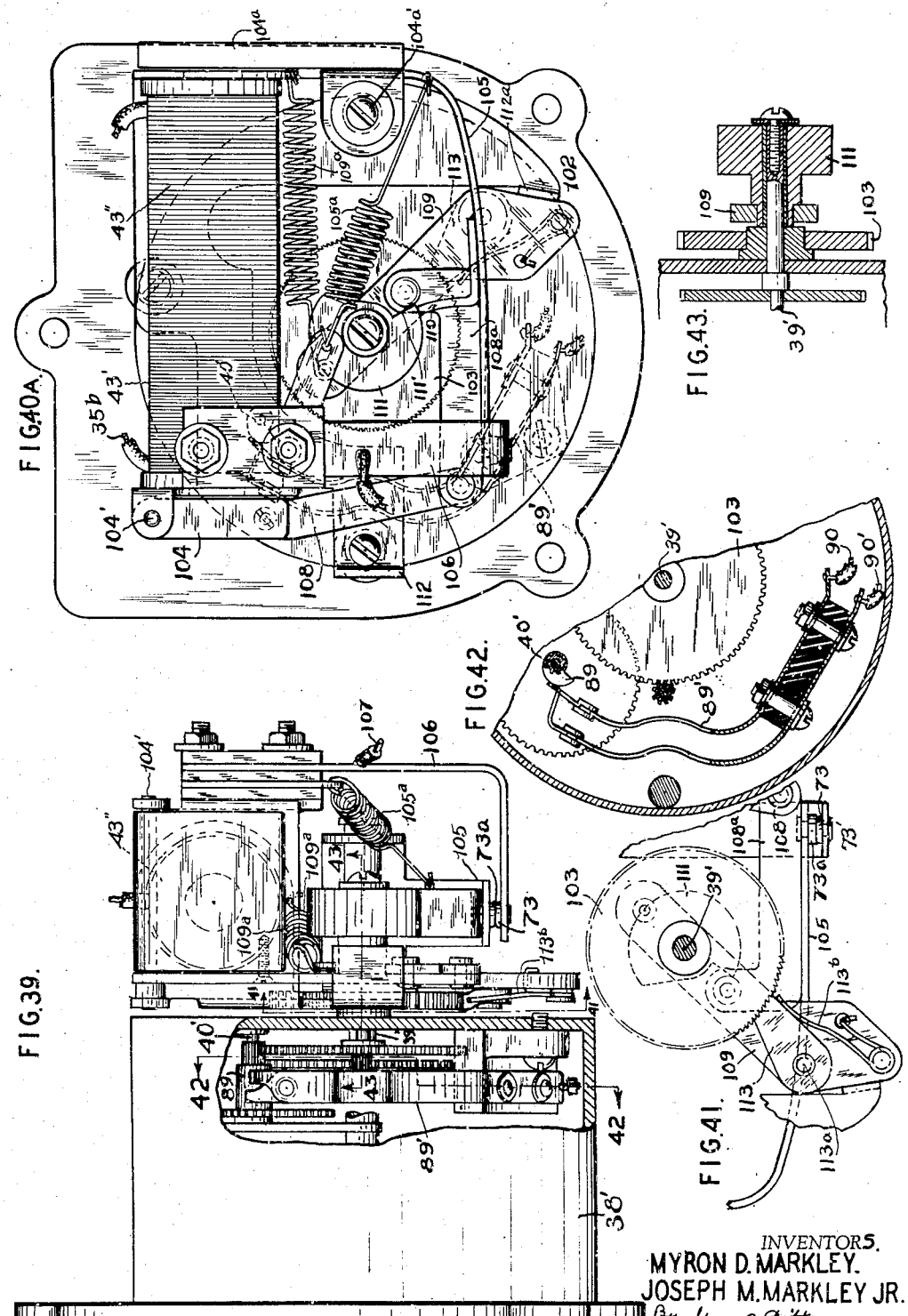

Nov. 15, 1949    M. D. MARKLEY ET AL    2,487,819
MECHANISM FOR INDICATING THE OPERATIONS OF MACHINES
Filed Oct. 6, 1939    21 Sheets-Sheet 21
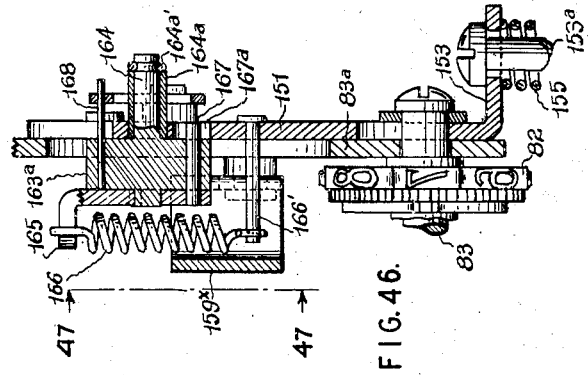
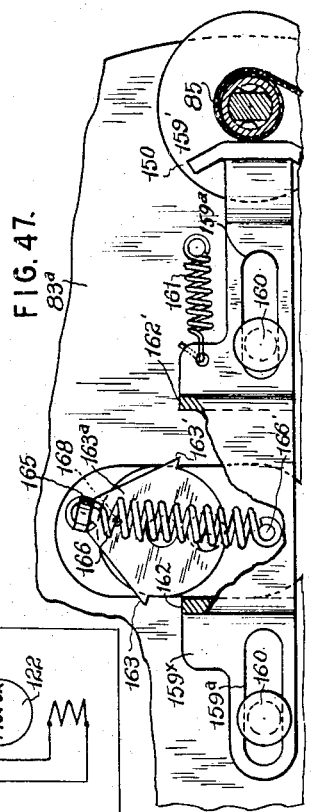
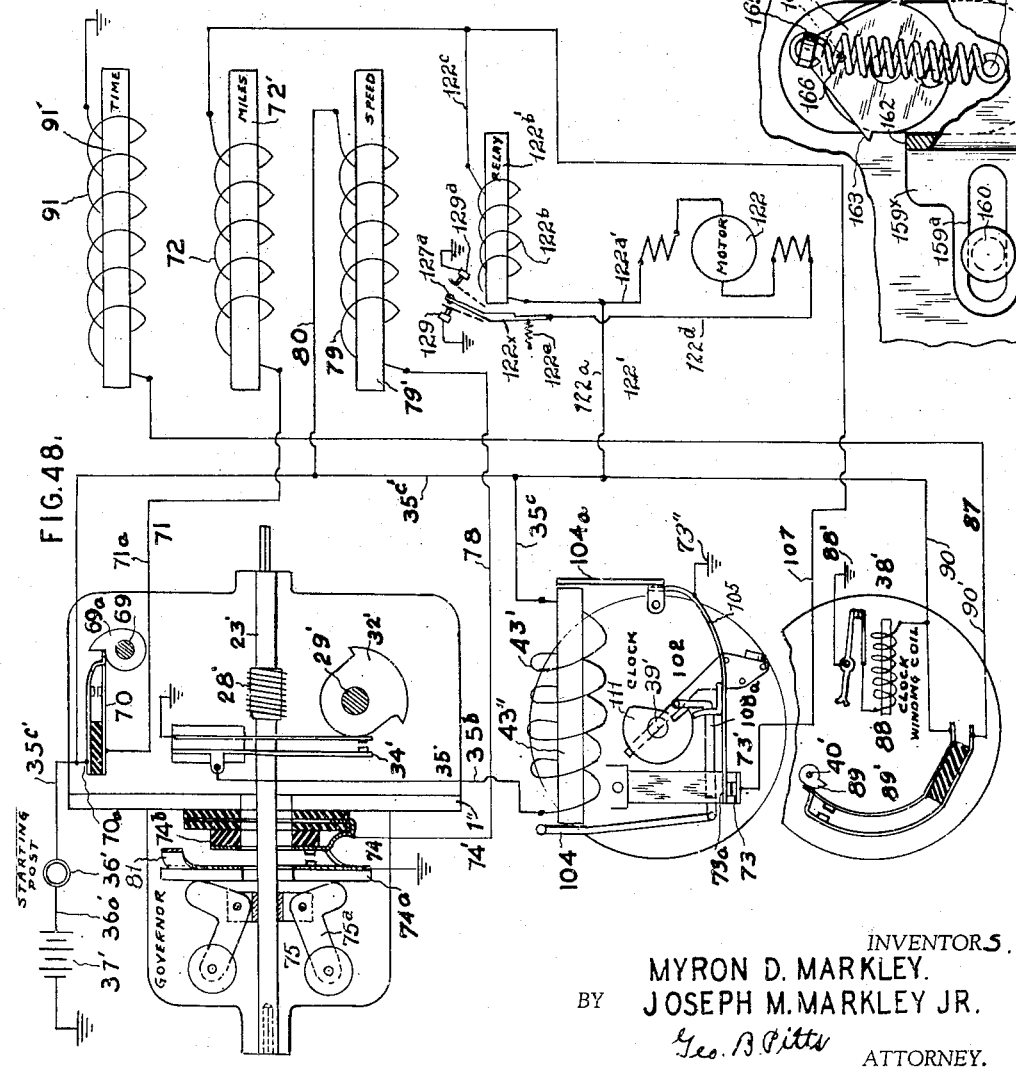
INVENTORS.
MYRON D. MARKLEY.
BY  JOSEPH M. MARKLEY JR.
Geo. B. Pitts    ATTORNEY.

Patented Nov. 15, 1949

2,487,819

UNITED STATES PATENT OFFICE 2,487,819

MECHANISM FOR INDICATING THE OPERATIONS OF MACHINES

Myron D. Markley and Joseph M. Markley, Jr., Canton, Ohio

Application October 6, 1939, Serial No. 298,311

39 Claims. (Cl. 346—53)

This invention relates to mechanism adapted to be associated with a machine and inter-connected with or driven by a rotatable part thereof, for registering certain operating conditions in its use throughout a definite period. The definite period of use may be considered a work day of a predetermined number of hours. In the operation of certain machines it is desirable to ascertain how often the machine is stopped and to total the time of idleness in each work day. In certain other machines, such as vehicles, it is desirable to determine driving at or above a predetermined speed and other conditions, and to total and record the mileage when each stop is made. The invention is particularly useful in connection with the operation of machines where, for various reasons, the operator is not or cannot be supervised; in other words, the invention is useful in determining the times during which the machine is running and the length of time it is idle, whereby certain cost factors and the diligence and efficiency of the operator may be determined or checked from day to day.

The forms of mechanism herein disclosed may be connected to any machine having a driven rotatable member. In the preferred application of our invention, we have disclosed it for use upon a vehicle whereby the operations thereof may be determined. In such application, the work day may be determined by hours, or the period between the time the vehicle starts on a trip or route and returns at the end thereof.

The mechanisms herein disclosed are particularly adapted for use on a vehicle which is driven from place to place, for example, a vehicle used by a salesman, delivery man, collector, solicitor and the like, one mechanism herein disclosed being arranged to show or indicate visually how many stops, each of which was in excess of a predetermined time period, were made during the work day period and the total of such excess time and the other mechanism being arranged to permanently record similar and other data.

By means of these mechanisms losses of time (one thereof showing unnecessary travel requiring the consumption of time, gas and oil) are determined, whereby the vehicle owner may compute certain cost factors, which obviously have a direct or indirect relation to the business in which the vehicle is employed as well as the efficiency and integrity of the driver.

One object of the invention is to provide an improved mechanism of this type that may be readily installed in a vehicle and which operates positively, whereby the owner of the vehicle may keep accurate account of the vehicle operations and its driver for each work day period.

Another object of the invention is to provide an improved mechanism of this type arranged to operate under certain predetermined conditions with respect to distance traveled after each stop and length of time or excess time occupied in making each stop, whereby abnormal operating conditions are indicated.

Another object of the invention is to provide an improved mechanism of this type adapted to make a permanent record of the distance traveled, time occupied in travel between stops and periods occupied for stops as well as the time of each stop.

In the mechanism herein disclosed, a suitable clock mechanism and a connection with a driven part of the vehicle (for example, a shaft of the transmission) are employed and provision is made to set the mechanism in condition for operation upon the driving of the vehicle—following each stop—a predetermined distance (for example, approximately 250 feet), so that the vehicle may be moved a short distance for various reasons, as where it becomes necessary to change its parking position. Provision is also made to indicate the number of stops and the time occupied for the stops. In one form of construction the mechanism indicates the number of stops each of which exceeds a predetermined time period and the total excess time of those stops in a work day period. Accordingly, another object of the invention is to provide an improved mechanism capable of operating in a manner to effect the indications above referred to.

A further object of the invention is to provide for a vehicle an improved mechanism wherein the mileage for each vehicle travel between stops, the time each stop commences and ends, excess speed, and tampering with the time operating devices are printed on a web.

A still further object of the invention is to provide an improved mechanism for application to a vehicle controlled by the travel and non-travel thereof to indicate abnormal use or operations of the vehicle.

Other objects of the invention will be apparent to those skilled in the art to which our invention relates from the following description taken in connection with the accompanying drawings, wherein Fig. 1 is a fragmentary view of a vehicle showing a mechanism embodying our invention installed therein.

Figs. 4, 5, 6 and 7 are sections on the lines 4—4, 5—5, 6—6, 7—7, respectively, of Fig. 3.

Fig. 8A is a view similar to Fig. 8, but shows parts in operated position.

Fig. 9 is a side view of parts shown in Fig. 8, portions of the casing walls being broken away.

Fig. 10 is a fragmentary section on the line 10—10 of Fig. 9.

Fig. 11 is a fragmentary section on the line 11—11 of Fig. 9.

Fig. 12 is a fragmentary plan view of the primary control means, the casing therefor being in section on the line 12—12 of Fig. 13.

Fig. 13 is a section on the line 13—13 of Fig. 14, but showing the parts thereof in elevation.

Fig. 14 is a section on the line 14—14 of Fig. 13 (looking in the direction indicated by the arrows $a$), but showing the parts in side elevation.

Fig. 15 is a section on the line 14—14 of Fig. 13 (looking in the direction indicated by the arrows $a'$).

Fig. 16 is a diagram of the circuits and electrical devices employed for the indicating mechanism shown in Figs. 1 to 15, inclusive.

Fig. 17 is a fragmentary sectional view of a vehicle showing in side elevation a modified form of mechanism embodying our invention, wherein the operations of the vehicle are recorded on a paper web.

Fig. 20, is an elevation, looking towards the right of Fig. 19 and towards the left of Fig. 18, on the line 20—20 thereof.

Fig. 21 is an end elevation looking towards the left of Fig. 19 and towards the right of Fig. 18, on the line 21—21 thereof.

Fig. 22 is a section through the primary control means.

Figs. 23, 24 and 25 are sections on the lines 23—23, 24—24 and 25—25, respectively, of Fig. 22.

Figs. 26 and 27 are sections on the lines 26—26 and 27—27, respectively, of Fig. 23.

Figure 18:
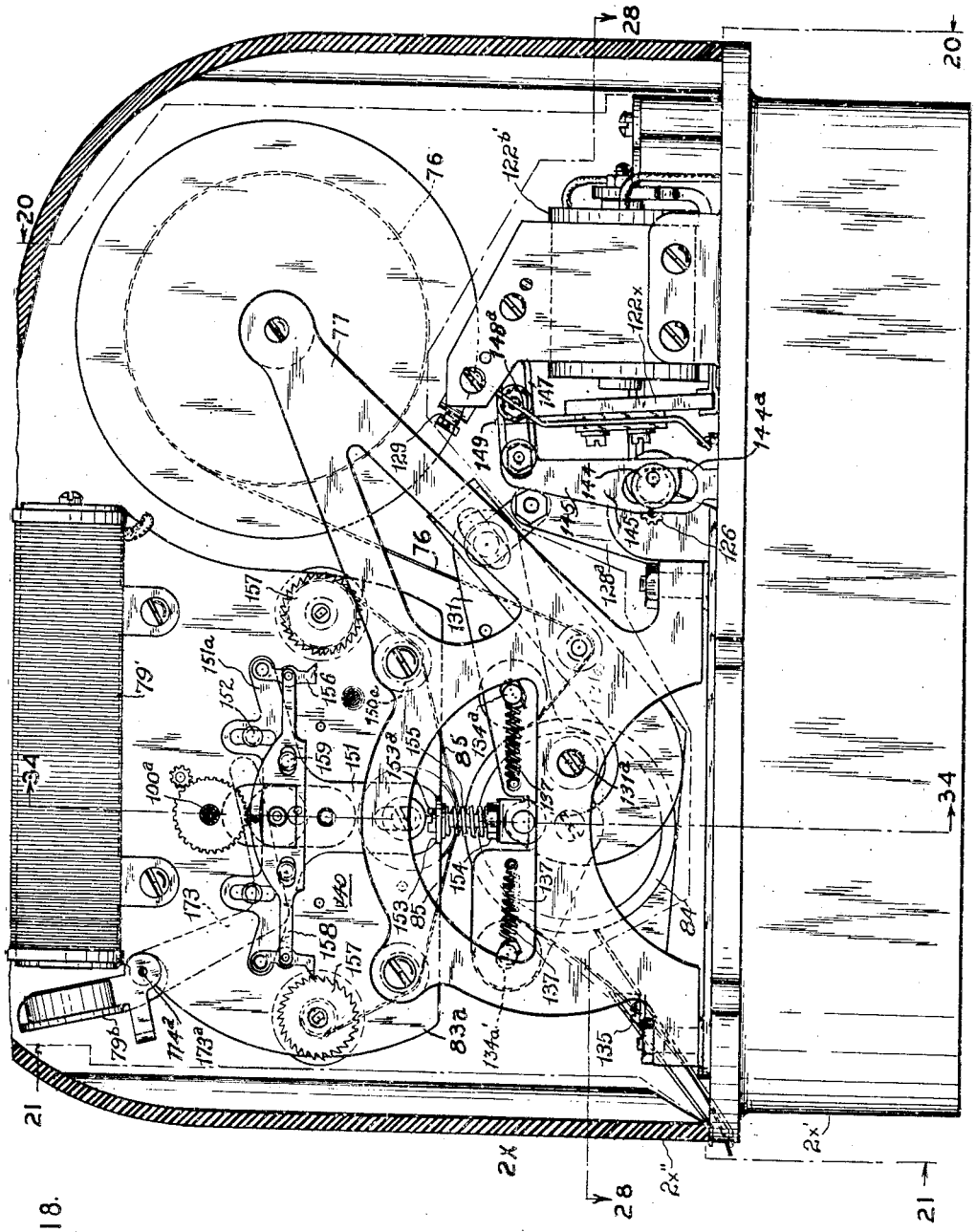
Fig. 18 is a side elevation of the mechanism (the casing being in section), enlarged.
Figure 19:
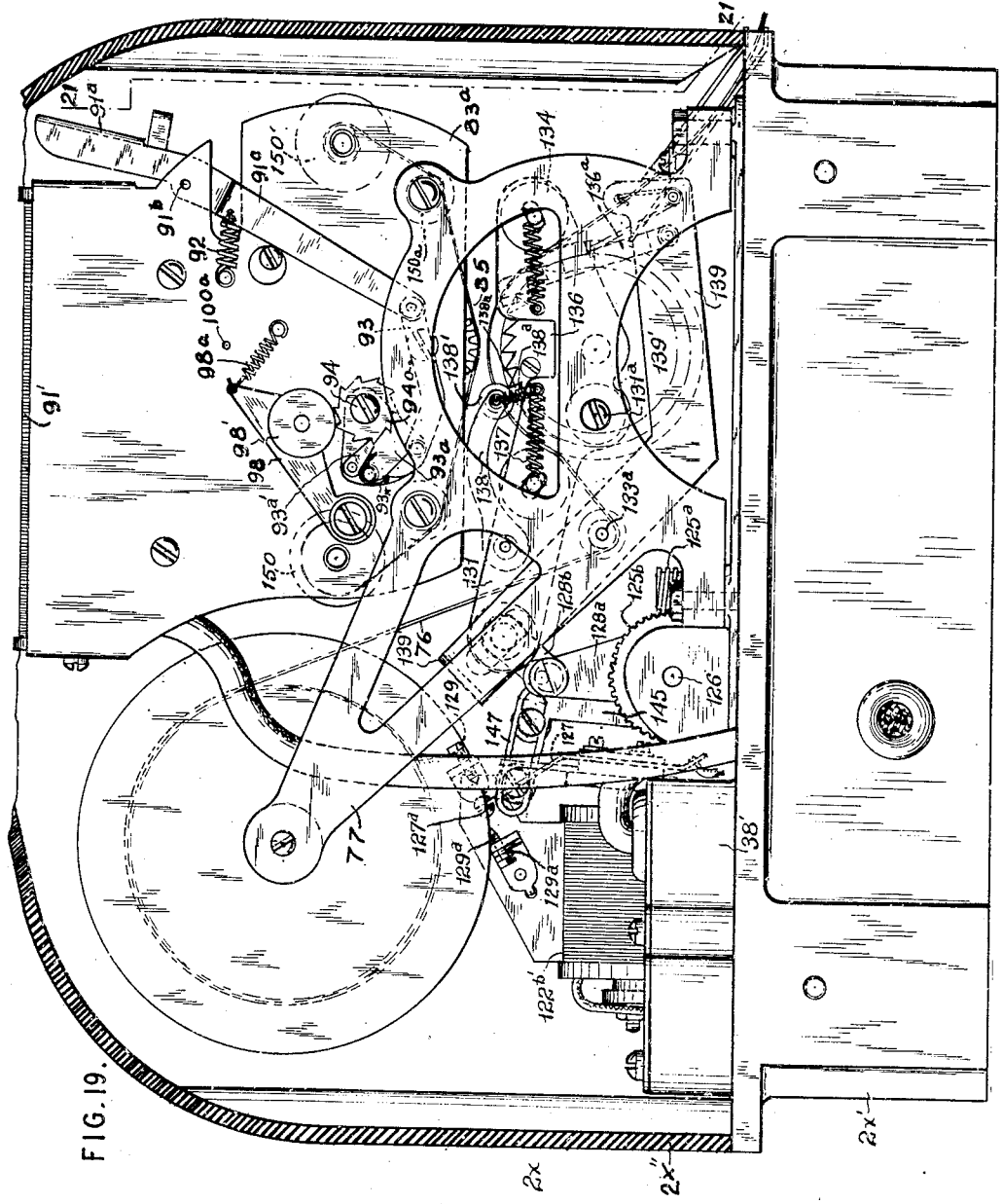
Fig. 19 is a side elevation of the mechanism, enlarged, from the side opposite to that shown in Fig. 18.
Figure 28:
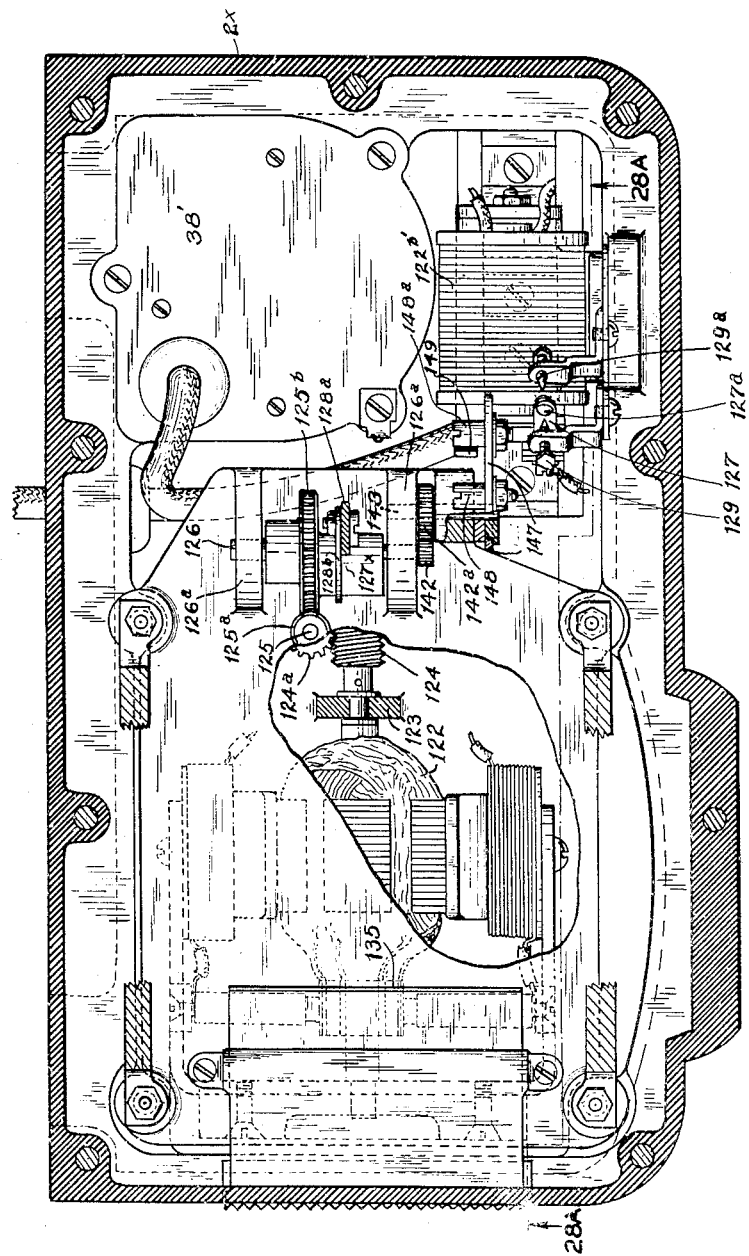

Fig. 28 is a section on the line 28—28 of Fig. 18.

Figure 28A:
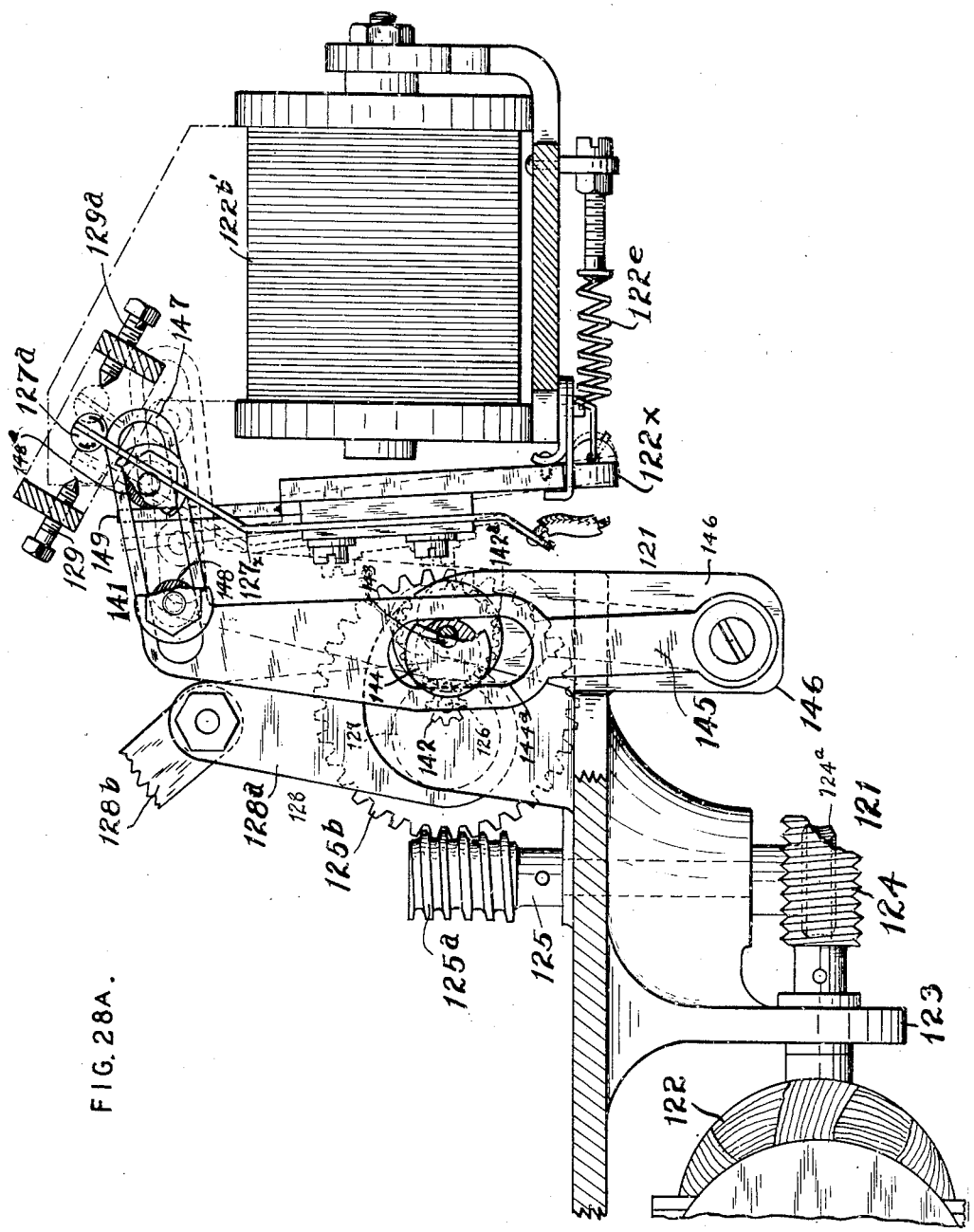

Fig. 28A is a section on the line 28a—28a of Fig. 28.

Figure 29:
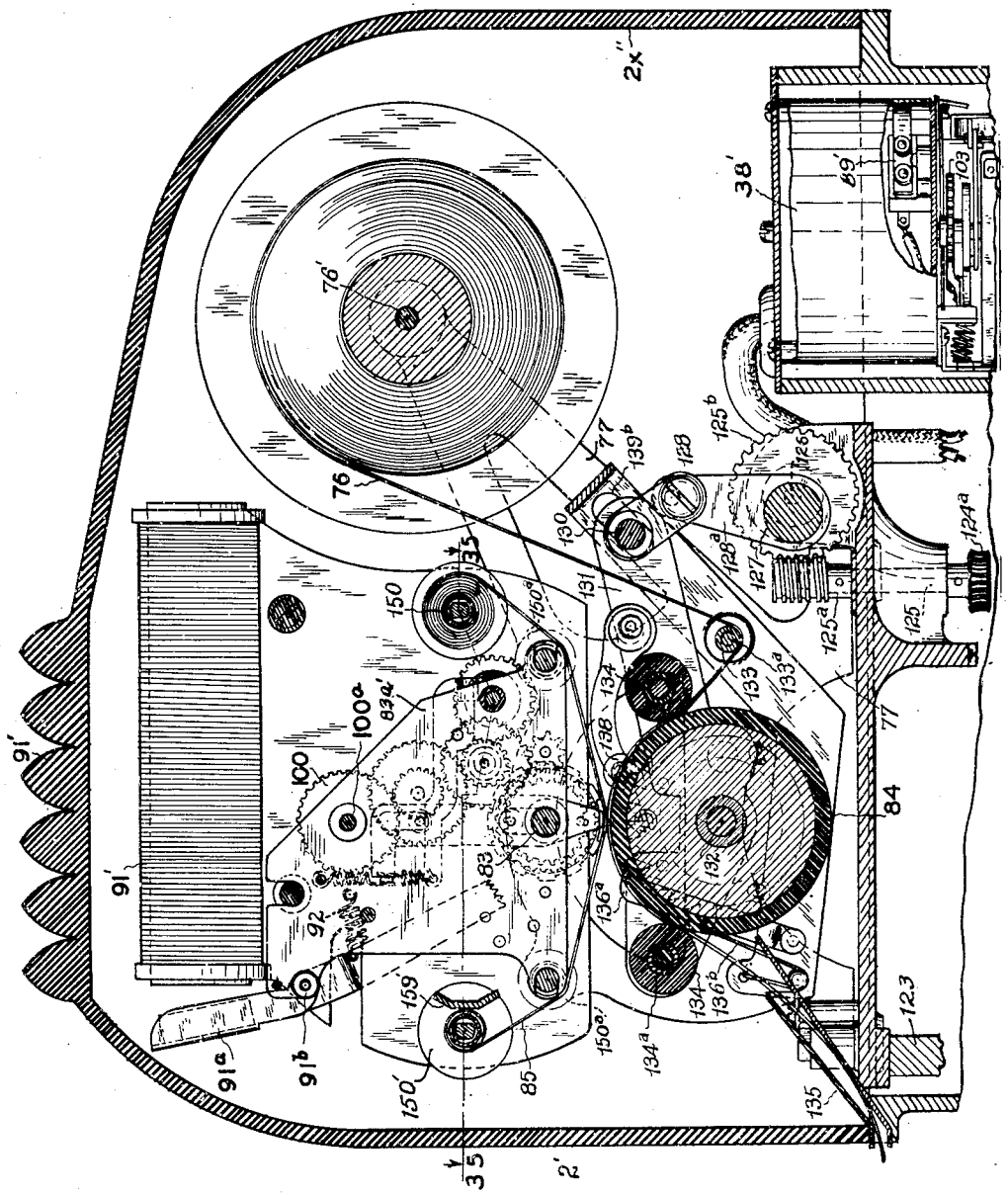

Fig. 29 is a section on the line 29—29 of Fig. 21.

Figs. 30 and 31 are fragmentary sections on the line 30—30 of Fig. 21, Fig. 30 looking towards the right and Fig. 31 looking towards the left.

Fig. 31A is a perspective view of a detail.

Figs. 32 and 33 are fragmentary sections on the line 32—32 of Fig. 21, Fig. 32 looking towards the left and Fig. 33 looking towards the right.

Fig. 33A is a perspective view of a detail.

Figure 34:
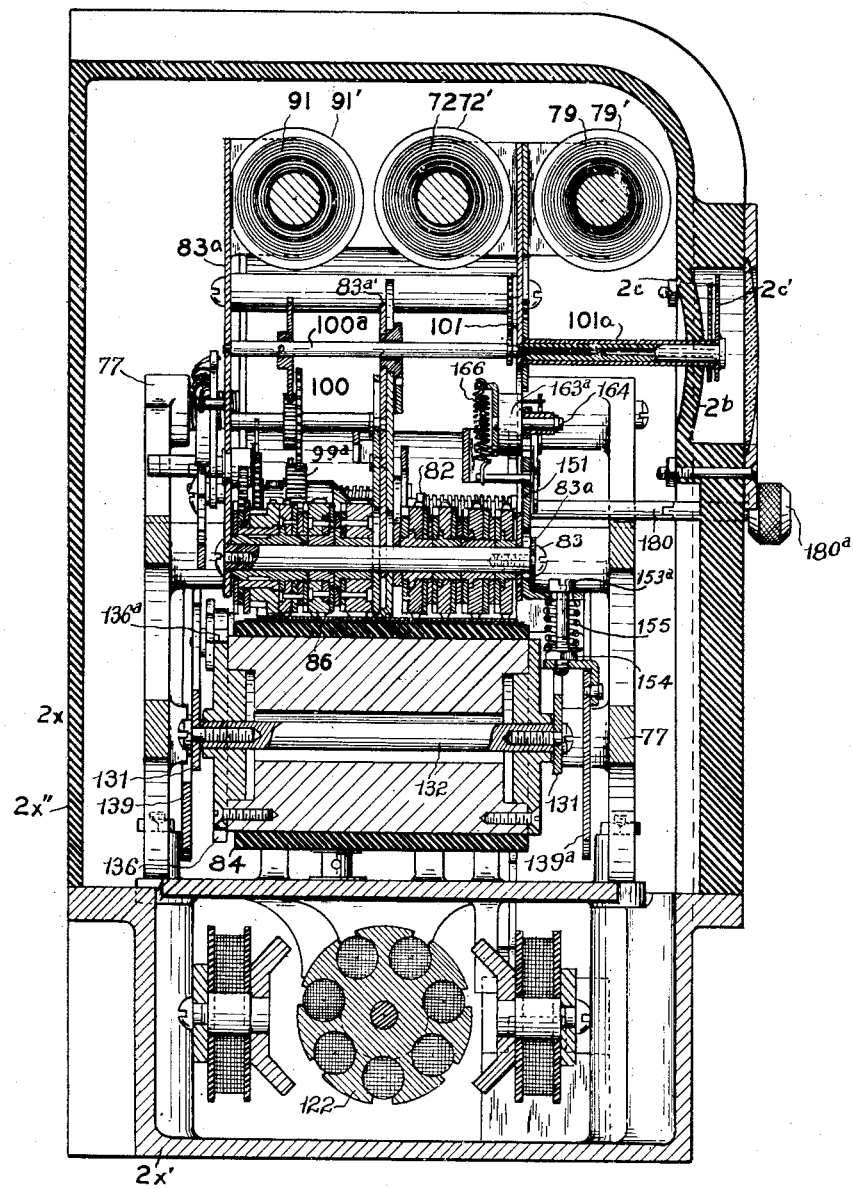

Fig. 34 is a section on the line 34—34 of Fig. 18.

Fig. 35 is a fragmentary section on the line 35—35 of Fig. 29.

Fig. 36 is a fragmentary sectional view of parts shown in Fig. 35, enlarged.

Figs. 37 and 38 are sections on the lines 37—37 and 38—38, respectively, of Fig. 36.

Fig. 39 is a side view of the clock mechanism and predetermined time control means, the casing for the clock mechanism being broken away.

Figures 40, 49:
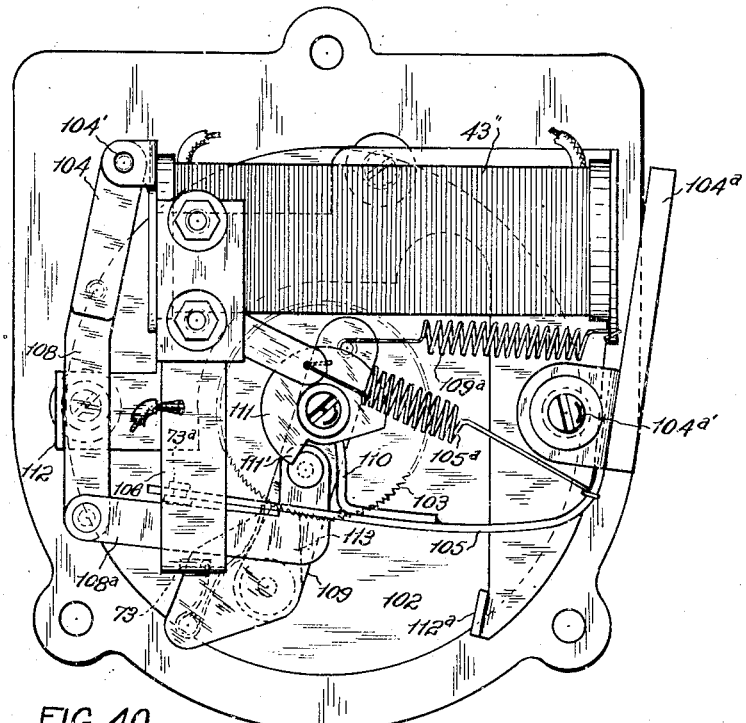

Fig. 40 is a front elevation of the parts shown in Fig. 39, enlarged.

Fig. 40A is a view similar to Fig. 40, but showing the parts in operated position.

Figs. 41, 42 and 43 are fragmentary sections on the lines 41—41, 42—42 and 43—43, respectively, of Fig. 39.

Figs. 44 and 45 are fragmentary sectional views showing the parts of the ribbon and paper feed mechanisms.

Fig. 46 is a fragmentary section showing parts of the ribbon reversing mechanism, enlarged.

Fig. 47 is a fragmentary side view of parts shown in Fig. 46 on the line 47—47 thereof.

Fig. 48 is a diagram of the circuits.

Fig. 49 is a plan view of the operative's report showing a portion of the web, which has been removed from the mechanism, attached thereto.

Referring to the drawings, (Figs. 1 to 16, inclusive) the mechanism comprises two units, to wit, a primary control means indicated as an entirety at 1 mounted in a casing 1a (see Figs. 1, 12, 13, 14, and 15) and an operating or indicating mechanism, indicated as an entirety at 2 mounted in a casing 2a (see Figs. 1, 2 to 11, inclusive). The casing 1a is mounted on the wall of the transmission box or housing A of the vehicle since a member driven by the vehicle transmission, preferably that member which is connected to and drives the vehicle speedometer A', is employed to operate the primary control means and the casing 2a is (by preference) mounted on the vehicle instrument board B, as shown in Figs. 1, 2, 3 and 6, whereby the glass enclosed dial or face 3 of the mechanism 2 is readily visible. The mechanism 2 includes (a) a hand 4 movable relative to numbered graduations 4a to indicate the number of stops, each of which is in excess of a predetermined time period—say 10 minutes—made in a work day and (b) hour and minute hands 5, 5a, respectively, movable relative to a dial 5b to indicate the total excess time lost in a work day; the latter hands being geared together so that the hand 5a makes one revolution for each hour indicated by the hand 5. The hands 4, 5 and 5a are operated in the manner hereinafter set forth.

At the end of a work day, at which time a record may be made of the excess stops and total time thereof, the hands 4, 5 and 5a are set at zero "0" ready for the next day's trip and then the resetting devices are locked to prevent tampering by the driver or any unauthorized person. The shaft 6 for the hand 4 and the shafts 7, 7a, for the hands 5, 5a, respectively (Fig. 6), are suitably mounted in front and rear supporting plates 8, 8a, the shafts 6 and 7 being provided with gears 9, each in mesh with a pinion 10. Each pinion 10 is fixed to a shaft which is provided with a gear 11, the latter being arranged to be engaged and operated by a gear 12. Each gear 12 is fixed to a shaft 13 mounted to slide endwise in alined openings formed in the plates 8, 8a, and an opening formed in the casing 2a (see Fig. 6), the shaft 13 being normally biased outwardly by a spring 14 coiled around the shaft and interposed between the adjacent gear 12 and the plate 8a, to normally maintain the gear out of engagement or mesh with the adjacent gear 11; but by moving the shaft 13 endwise inwardly (which movement is limited by a shoulder 15 engaging the plate 8a—see Fig. 6) the gear 12 will engage the gear 11, so that upon rotation of the adjacent shaft by means of a knob 16 on its outer end, the gear 12 through the adjacent gear train will re-set the hand 4 or hands 5, 5a, to "0" position. To prevent such setting or resetting operations by an unauthorized person, we provide a locking mechanism which is effective to prevent the endwise movement of the shaft inwardly, such mechanism being preferably common to both shafts 13 to permit locking and unlocking thereof by one lock 17, which is operated by a key 17a. Each of the shafts 6 and 7 is connected to a coiled spring 6a, the spring 6a for the hand 4 normally tending to move it relative to the graduations 4a and the spring 6a for the hand 5 normally tending to move the hands 5, 5a, relative to the dial 5b, the movement of the hands 4, 5 and 5a under the influence of the springs 6a being controlled step-by-step by escapement mechanisms later referred to. Each of the springs 6a is rewound when the hand or hands connected thereto is or are returned to "0" position by operation of the adjacent shaft 13, as already set forth. The shaft 6 is provided with an arm 6b which engages with a stop 6c to limit the re-setting movement of the hand 4 at "0" position, whereas the shaft 7 is provided with an arm 7b, which engages with a stop 7c (see Figs. 3 and 4) to limit the re-setting movement of the hands 5, 5a, at "0" position.

Of the locking mechanism for the shafts 13, 18 indicates a pair of slidable locking members (preferably of arcuate shape) slidably mounted on the rear side of the plate 8a by headed pins 19 suitably mounted thereon and extending through elongated slots 18a formed in the members 18. The outer end of each locking member slidably fits a recess formed in a block 20 which is secured to the rear side of the plate 8a, the pins 19 and walls of the recess serving to guide the adjacent member endwise in relation to the inner end of the adjacent shaft 13, so that when the locking members are in the position shown in Figs. 5 and 7, the shafts 13 may be moved endwise inwardly to effect engagement of the gears 12 with the gears 11, as already described; but when the locking members 18 are moved endwise away from each other by the operation of the lock 17, their outer ends are projected across the path of endwise movement of the shafts 13 and thus prevent their operation to effect the engagement of the gears 12 with the respective gears 11. The inner ends of the locking members 18 are connected together by a spring 21, which normally tends to retract them to the position shown in Figs. 5 and 7. The inner ends of the locking members 18 are provided with lateral extensions or wings 22 which are arranged upon opposite sides of a bar 22a, the latter being operatively connected to the lock 17, and when the bar is turned to the position shown in Fig. 7, the spring 21 retracts the locking members 18; but when the bar 22a is rotated a quarter turn (see Fig. 5) by the lock 17, the locking members are moved away from each other endwise into position to prevent operation of the shafts 13, as already set forth. The lock 17 may be of any desired construction, that shown consisting of a rotatable barrel 17b having a plurality of spring operated tumblers 17c which prevent removal of the key 17a when the lock is operated to release or unlock the shafts 13 but expand into the recesses 17d of the lock housing upon operation of the lock 17 to lock the shafts 13, whereby the key 17a may be removed. The barrel 17b may be secured in its housing in any desired manner.

The primary control mechanism 1 consists of the following: 23 indicates a shaft mounted in the rear and front walls of the casing 1a (the front wall thereof being removable as shown). The inner end of the shaft 23 is connected with a driven member 24 of the transmission mechanism within the housing A, preferably that member which is ordinarily connected to and drives the shaft C for the vehicle speedometer and travel meter A'; the outer end of the shaft 23 being connected to the shaft C. In this arrangement, the shaft 23 forms a driving connection between the driven member 24 and shaft C and serves to operate the control mechanism, so that the latter may be readily applied to the vehicle without any alteration or reconstruction thereof. The casing 1a is mounted on the housing A by means of a hollow coupling 25, through which the inner end of the shaft 23 extends, the outer end of the coupling being threaded into an opening formed in the rear wall of the casing 1a and its inner end having a flange engaged by a nut 26 which is threaded on the boss a surrounding the member 24 and formed integrally on the side wall of the transmission housing A. The outer wall or cover for the casing 1a is provided with an externally threaded boss 1a' to take the nut (not shown—similar to nut 26) which connects that member on the inner end of the shaft C which is ordinarily threaded on the boss a. The inner end portion of the shaft 23 is formed in connected-together sections, one of which (indicated at 23a) consists of a coiled spring to provide a universal joint between the main portion of the shaft and the driven member 24.

28 indicates a worm fixed to the shaft 23 and in mesh with a worm gear 28a frictionally connected to a shaft 29, which is suitably mounted in bearings 29a, 29a'. The shaft 29 is provided with a sleeve 30 which is fixed thereto by a pin 30c. That end of the sleeve 30 remote from the bearing 29a is provided with a resilient concavo-convex plate having radial arms 30c' yieldingly engaging the worm gear 28a and normally forcing it into engagement with a pin 30a on the shaft 29, whereby the worm gear 28a is drivingly connected through the sleeve 30 to the shaft, but may slip or rotate thereon when the shaft is locked. A ratchet wheel 31, loosely mounted on the shaft 29, is provided on one side with a cam 32 and on its opposite side with a lateral projection or pin 31a disposed in the path of movement of a pin 31b extending radially from the shaft 29, so that in each revolution of the latter the ratchet wheel and cam, through the engagement of the pin 31b with the pin 31a, are picked up by the shaft and rotated (counter-clockwise as viewed in Fig. 14) a predetermined distance, that is, until a spring 33 (which is connected at one end to one side of the cam 32) effects a quick rotative movement in the same direction of the ratchet wheel and cam relative to the shaft 29. The spring 33 normally tends to hold the ratchet wheel and cam in a predetermined position (see Fig. 14), but permits the pin 31b to rotate the ratchet wheel and cam with the shaft, to move the spring relative to the axis of the shaft 29 to a point on one side of its "dead center" position under tension, so that the spring may operate the cam to its normal position with a quick movement, the purpose of which is to momentarily close a normally open switch 34 in a circuit 35 and set the mechanism 2 in operation as later set forth. The active portion of the cam 32 is so arranged angularly of its axis, relative to the connection of the spring 33 with the cam and the position of the switch 34, that such portion is in engagement with the switch 34 only during the quick or accelerated movement of the cam, at which time the cam 32 is moving relative to the shaft 29, to prevent closing of the switch when the vehicle is brought to a stop, since (as will later be obvious) the mechanism 2 hereinafter referred to would be in operation if the circuit 35 remained closed when the vehicle was not traveling. The ratchet wheel 31 is alternately engaged by a pair of dogs 35a, 35a, on a rocker 35a', to provide an escapement mechanism, which retards the movement of the cam 32 under the influence of the spring 33, whereby the circuit 35 remains closed long enough for the flux to build up in a coil (later referred to). The dogs and teeth on the ratchet wheel are arranged so as to permit the shaft 29 to turn in one direction and to lock it against turning in the opposite direction. Accordingly, the shaft 29 is rotated by the worm gear when the vehicle is being driven forwardly, but is locked against rotation when the vehicle is driven in a rearward direction.

It will thus be seen that in each revolution of the shaft 29 the circuit 35 is closed and opened. The gear ratio between the worm 28 and worm gear 28a is such that the shaft 29 makes one revolution upon the driving of the vehicle a predetermined distance, for example, approximately 250 feet. Accordingly, the switch 34 is operated and the circuit 35 closed and opened in each 250 feet of forward travel of the vehicle. The switch 34 preferably consists of a pair of spring metallic strips having related contact points and mounted in a block of insulation material 34a, one strip being grounded and the other strip being connected by a main lead 35x to a contact member 36 (preferably on the starter post—see Fig. 16) which in turn is connected by a lead 36a to the positive side of a battery 37, the negative side of the battery being grounded.

38 indicates a suitable clock mechanism, the operation of which controls certain circuits, as hereinafter set forth. The clock mechanism 38 being of standard construction, only a portion thereof (see Fig. 9) is shown. The clock mechanism 38 may be manually wound, but to insure its continuous operation, we have by preference, illustrated a clock mechanism which is automatically wound by an electro-magnet 41 (see Fig. 16) shown connected to a lead of one of the circuits and grounded at 41a. As such winding means for a clock mechanism is well known, the detail construction and controlling devices for the energization and de-energization of the electro-magnet coil are not shown.

In the present application of our invention and as hereinafter set forth, (a) that shaft 39 of the clock mechanism which makes one revolution in 60 minutes (hereinafter designated the minute hand shaft) is utilized to control a circuit at the end of a predetermined time period and (b) that shaft 40 of the clock mechanism which makes one revolution each minute (hereinafter designated the second hand shaft) is utilized to control another circuit.

Figure 1:
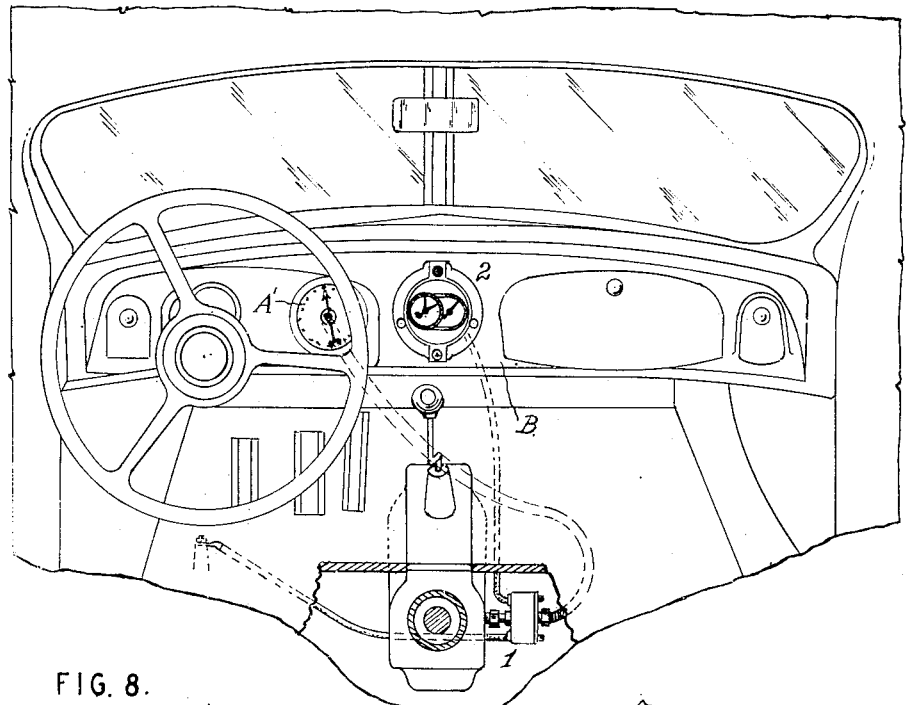
Figure 8:
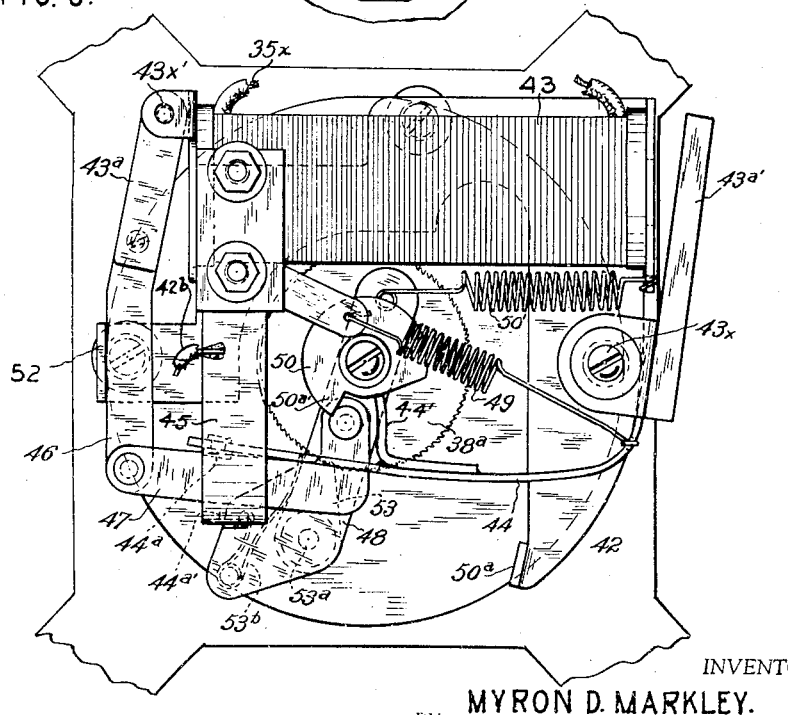
Fig. 8 is a fragmentary elevation on the line 8—8 of Fig. 3, enlarged.
Figure 2:
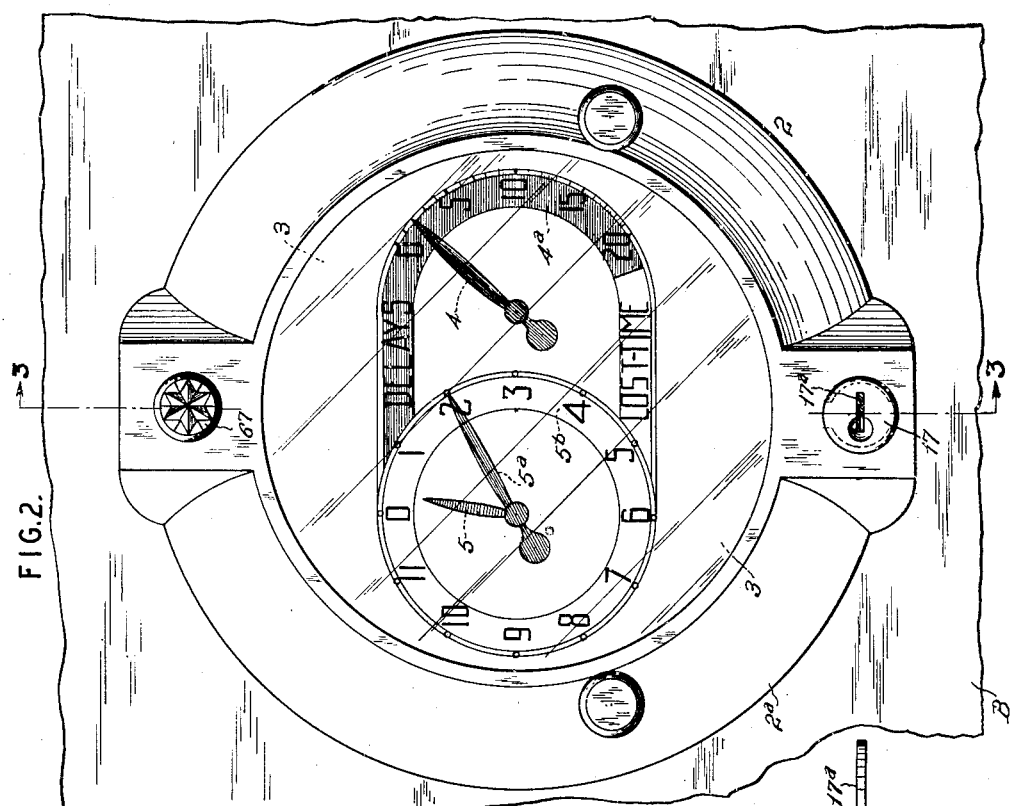
Fig. 2 is a front elevation of the operating mechanism and its support, such as the instrument board of the vehicle; being a section on the line 2—2 of Fig. 3.
Figure 3:
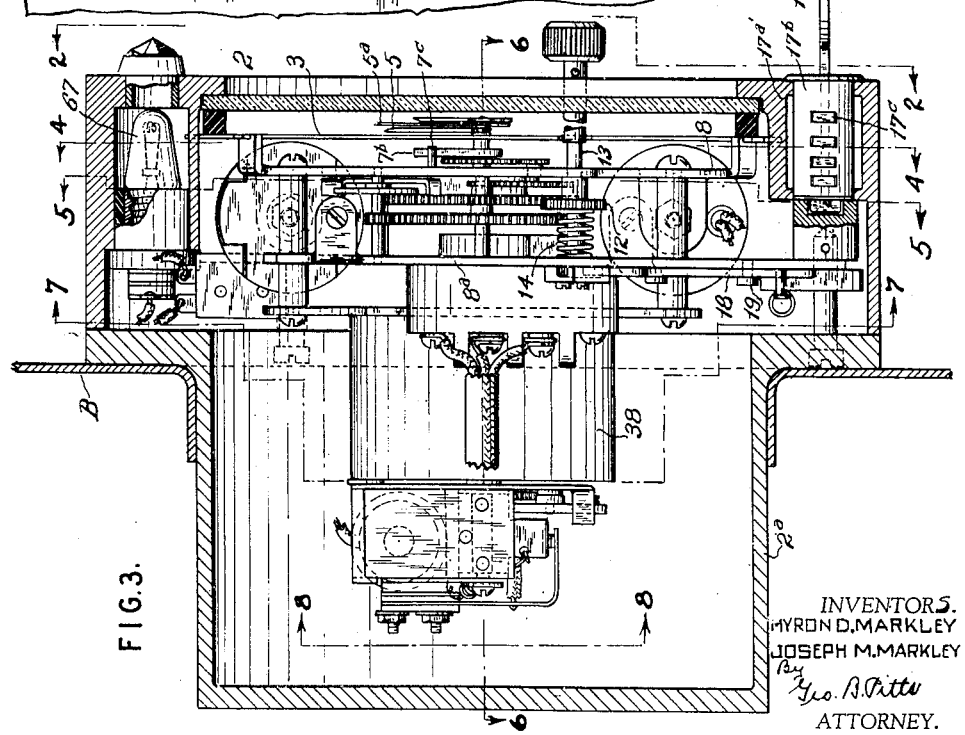
Fig. 3 is a section on the line 3—3 of Fig. 2.

The circuit 35, when closed, as already described, serves to operate a time setting mechanism, indicated as an entirety at 42 (see Figs. 8, 8A and 9), which in turn controls the closing and opening of a separate circuit 42a, so that at the end of a predetermined time period, for example, ten minutes (dependent upon the setting or adjustment of the mechanism 42), in the event the vehicle has been brought to a stop (which stops the driving of the member 24), the shaft 6 for the hand 4 will be operated one step to register the stop on the graduations 4a and the shaft 7 for the hand 5 (which is geared to the hand 5a, as already set forth) will be operated to indicate on the dial 5b the time in excess of the predetermined time period occupied in the stop, this mechanism serving to stop the operation of the hands 5, 5a, as soon as the switch 34 operates due to resumption of travel of the vehicle. The mechanism 42 consists of the following: 38a indicates a ratchet wheel fixed to the shaft 39 which makes one revolution each hour. 43 indicates an electro-magnet having armatures 43a, 43a' at its opposite ends; the coil of the magnet, being connected in the circuit 35, is energized when the switch 34 is closed. The armature 43a' which is pivoted at 43x, is provided with an extension 44, which is grounded at 42', preferably formed of resilient metal and having a contact 44a. The contact 44a is arranged to engage a contact 44a', which is provided on a bracket 45, connected to the lead 42b of the circuit 42a, the circuit being closed when the contacts 44a, 44a', are engaged. The armature 43a, which is pivoted at 43x', is provided with an extension 46. The extension 46 is connected by a link 47 to a lever 48 fulcrumed on the shaft 39 (see Fig. 11). A spring 49 connected to the extension 44 normally serves to swing the armature 43a' to the position shown in Fig. 8 (in which position the contacts 44a, 44a', are disengaged to open the circuit 42a), such movement of the armature being limited by the engagement of a wing 44' on the extension 44 with the low portion of a cam 50 (later referred to); and a spring 50' connected to the tail of the lever 48 normally operates through the lever, link 47 and extension 46 to swing the armature 43a outwardly, as shown in Fig. 8, with the extension 46 against a stop 52. 53 indicates a dog pivoted at 53a on the inner face of the lever 48 and normally biased into engagement with the ratchet 38a by a leaf spring 53b. Upon energizing of the coil of the electro-magnet 43, the armature 43a', swings the outer end of the extension 44 downwardly to close the circuit 42a through the contacts 44a, 44a' (see Fig. 8A) and the armature 43a through the extension 46 and link 47 swings the lever 48 and rotates the cam 50 (which is fixed to the lever 48—see Fig. 11) to the position shown in Fig. 8A, against a stop 50a. The armature 43a' is arranged to operate in advance of the armature 43a, so that the wing 44' will clear the high portion of the cam 50 in the movement thereof from the Fig. 8 position to the Fig. 8A position, as above set forth. It will be understood that when the lever 48 is in the position shown in Fig. 8, the dog 53 rides the teeth of the ratchet wheel 38a (which is rotating clockwise as viewed in Figs. 8 and 8A), since the lever 48 is held against movement by the stop 52, but when the lever 48 is swung to the position shown in Fig. 8A, the dog 53 is effective to connect the lever to the ratchet wheel 38a, so that the latter operates to return the lever 48 to the position shown in Fig. 8. When the cam 50 is rotated to the position shown in Fig. 8A, the high portion 50a' thereof is in operative relation to or path of movement of the wing 44' and upon the de-energization of the coil of the magnet 43, the high portion 50a' prevents upward movement of the extension 44 and breaking of the circuit 42a through the contacts 44a, 44a', until the high portion 50a' in the return movement of the cam 50 has moved beyond the wing 44'. In the illustrated arrangement, the stops 52, 50a, for the lever 48 are arranged to limit its swinging movement through an arc having a length requiring the maximum time period that may be permitted for each vehicle stop before excess time occupied in the stop is to be indicated, for the lever to swing with the ratchet wheel 38a (when connected thereto by the dog 53) from the Fig. 8A position toward the Fig. 8 position; accordingly, by proper angular adjustment of the cam 50 on the lever 48 about the axis of the shaft 39, the high portion 50a' of the cam 50 will operate through the wing 44' to hold the contacts 44a, 44a', engaged throughout this maximum period of time or for a shorter predetermined time period, dependent upon the time required for the high portion 50a to move with the lever 48 relative to the wing 44' (according to the adjustment of the cam 50) from the Fig. 8A position clockwise and release the extension 44 for movement upwardly to the position shown in Fig. 8, during movement of the lever 48 from the Fig. 8A position to the Fig. 8 position thereof. In the arrangement shown, the cam 50 is adjusted so that its high portion 50a' releases the wing 44' prior to the lever reaching the limit of its movement by the engagement of the extension 46 with the stop 52; that is to say, the cam 50 is adjustably fixed on the lever 48 relative to the ratchet wheel 38a so that it takes ten minutes for the high portion to move with the ratchet wheel from the Fig. 8A position to the point where it releases the wing 44'.

Figure 4:
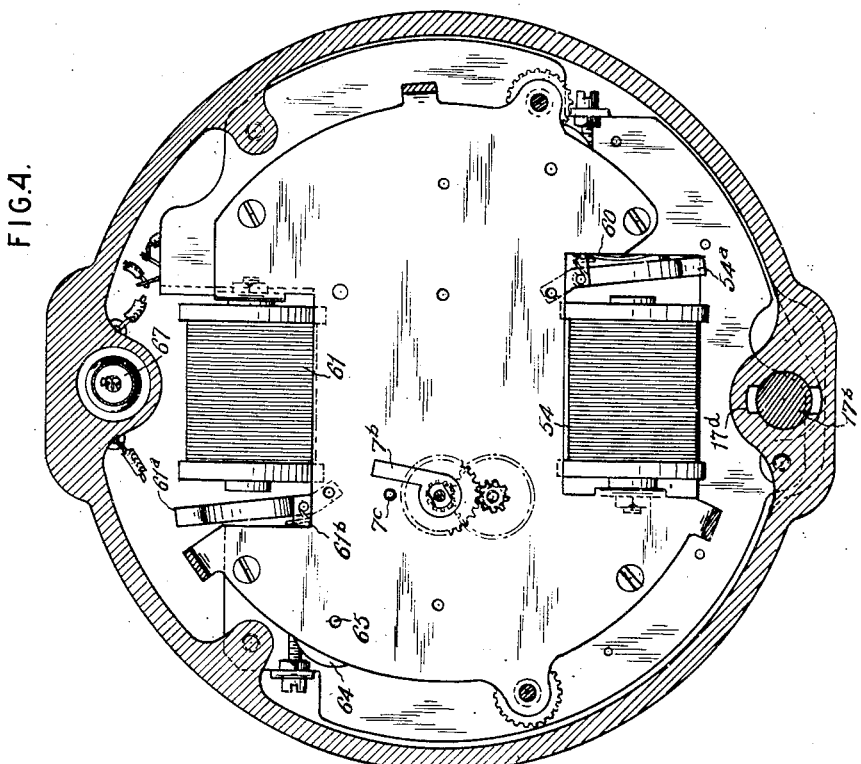
Figure 5:
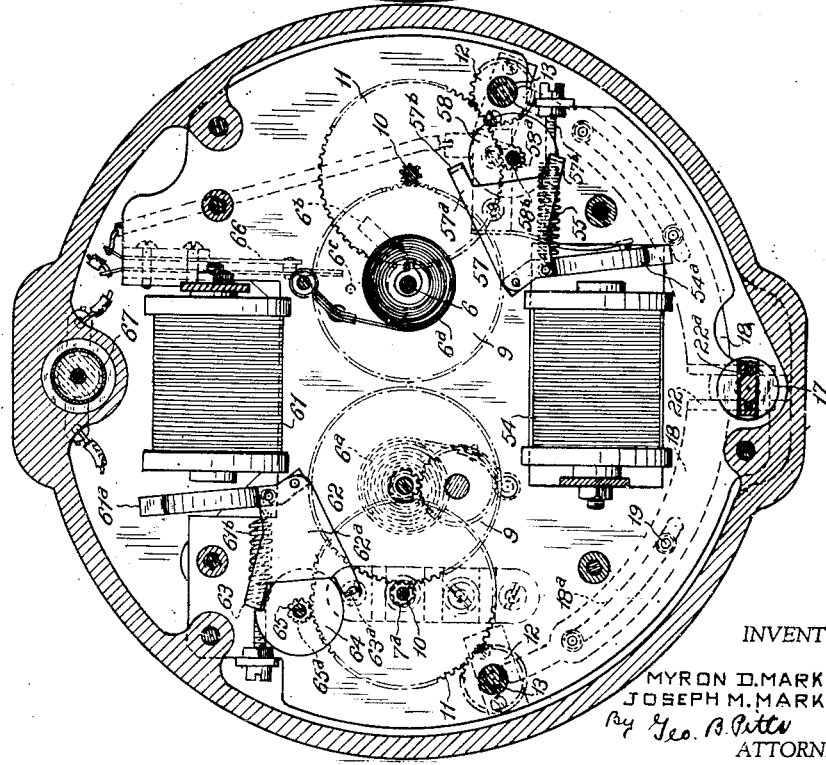

54 indicates an electro-magnet the coil of which is connected in the circuit 42a, its armature 54a being normally biased to the position shown in Figs. 4, 5 and 7 (and dotted lines in Fig. 16) by a spring 55 and arranged when operated to operate an escapement mechanism indicated as an entirety at 57 (Fig. 5) and control an auxiliary circuit 56; that is, when the armature 54a is in normal position the circuit 56 may be opened and closed by a switch 57' which is operated once in each revolution of the second hand shaft 40 (which is continuously driven by the clock mechanism 38), but when the armature 54a is operated to its other position, due to energization of the electro-magnet coil 54 (see full line position of armature shown in Fig. 16), the circuit 56 is open and the operation of the switch 57' is ineffective.

It may be here noted that since (1) the circuit 35 is closed by the cam 32 for each 250 feet of travel of the vehicle and that upon closing of this circuit and energizing of the coil of the electro-magnet 43, the arm or lever 48 is swung to the Fig. 8A position and (2) it requires a period of ten minutes for the cam 50 to release the member 44 in the movement of the arm 48 toward its normal position (Fig. 8), the vehicle, if in motion, will travel a greater distance than 250 feet in this period of time. Accordingly, the arm 48 after moving a short distance toward its normal position, will be returned to its operated position (Fig. 8A) so that the circuit 42a will remain closed through the contacts 44a, 44a', so long as the vehicle is being driven. But if the vehicle is brought to a stop, then the arm 48 will swing to its normal position and thus at the end of the predetermined time period, permit the cam 50 to open the circuit 42a. When the coil of the magnet 43 is energized in the first instance upon driving of the vehicle the first 250 feet, the armature 54a will operate the escapement mechanism 57 in one direction and upon release of the armature, due to the de-energizing of the magnet coil, the escapement mechanism 57 will operate in the opposite direction.

The escapement mechanism 57 comprises a plate 57a fixed to the armature and provided with spaced extensions forming pawls 57b each having on its free end a laterally extending lug disposed in the path of movement of a shoulder provided on the periphery of a rotatable disk 58. The disk 58 is fixed to a shaft 58a which is provided with a pinion 58b in mesh with the adjacent gear 11. As the gear 11 tends to rotate under the influence of the adjacent spring 6a (as already set forth), the disk 58 is driven clockwise, as viewed in Fig. 5, except as limited by the pawls 57b. When the circuit 42a is open and the coil of magnet 54 is de-energized, one pawl 57b locks the disk 58 against rotation, as shown in Fig. 5, but upon energizing of the coil and swing of the armature to its other position, the disk is released by one pawl 57b and the other pawl 57b moves into the path of movement of the shoulder on the disk 58 to stop it after the latter has made approximately a half revolution under the influence of the adjacent spring 6a, such operation serving to move the hand 4 approximately half the distance to the next graduation of the graduations 4b; then upon de-energizing of the magnet coil the armature swings to its normal position which reverses the position of the pawls and permits the disk 58 to rotate approximately another half revolution, such operation serving to move the hand to the next graduation, thereby indicating a stop of the vehicle in excess of the predetermined time limit as provided for by the movement of the arm 48 and cam 50. It will be understood that the escapement mechanism 57 operates each time the armature 54a swings from one position to the other, being controlled entirely by the closing and opening of the circuit 42a through the contacts 44a, 44a', so that the hand 4 only moves relative to the graduations 4b, first a partial distance from one graduation to the next graduation when the circuit 42a is closed and then to the said next graduation if the stop exceeds the predetermined time limit as determined by the cam 50.

The armature 54a is grounded at 56c (Fig. 16), which forms one terminal of the circuit 56, and is related to a resilient strip 60 to provide a switch 60a, the armature being arranged to engage a contact on the resilient strip 60 when the armature is in normal position (see Figs. 4, 5 and 7), and to disengage this contact when the armature is moved to its other position; that is, engaged with magnet 54 due to energizing of its coil.

61 indicates an electro-magnet the coil of which is connected in the circuit 56, its armature 61a being connected to and operating an escapement mechanism, indicated as an entirety at 62 (see Fig. 5), which controls the step-by-step movement, one step per minute, of the minute hand shaft 7a under the influence of the adjacent spring 6a.

The armature 61a is normally biased by a spring 61b to a position away from the magnet coil (see Figs. 4, 5, 7 and 16) and is operated into engagement with the coil or its core each time the coil is energized.

As already set forth, during the travel of the vehicle, the armature 54a is held in the position shown in full lines in Fig. 16, and the circuit 56 is open through the switch 60a, but in the event of a stop the duration of which exceeds the predetermined time period, as determined by the cam 50, then at the end of such period the switch 60a will be closed by the movement of the armature 54a to its normal position, whereby the operation of the switch 57' by the second hand shaft 40, once each minute, will energize and de-energize the coil of the magnet 61 to attract and repel its armature 61a, the effect of which is to operate the escapement mechanism 62. The escapement mechanism 62 consists of a plate 62a fixed to the armature 61a for swinging movement therewith and provided with extensions having on their free ends laterally extending lugs forming pawls 63, 63a, disposed in the path of movement of a shoulder provided on the periphery of a rotatable disk 64. The disk 64 is fixed to a shaft 65, which is provided with a pinion 65a, in mesh with the adjacent gear 11. The adjacent spring 6a normally exerts its influence through the gears 9 and 10 to drive the gear 11 (as already set forth), the latter gear in turn driving the disk 64 clockwise, as viewed in Fig. 5, except as limited by the pawls 63, 63a. As will be understood from Fig. 5, the plate 62a swings with the armature, so that in the movement of the latter due to the operation of the switch 57' to close the circuit 56 and energization of the coil of the magnet 61, the pawl 63 is disengaged from the shoulder on the disk 64 and the pawl 63a is positioned in the path of movement thereof to stop the disk after it has rotated approximately a half revolution under the influence of the adjacent spring 6a. As the coil of the magnet 61 is quickly de-energized due to the operation of the switch 57' to open the circuit 56, the plate 62a swings back to its first position to disengage the pawl 63a from the shoulder on the disk and to position the pawl 63 in the path of movement thereof, to stop the disk 64 after it has rotated approximately another half revolution. Accordingly, each time the circuit is closed and opened by the switch 57', the disk 64 rotates and makes one complete revolution, each such revolution serving to move the hand 5a one step equal to one minute on the dial 5b and the hour hand 5 its proportional distance.

From the foregoing description it will be seen that each of the shafts for the hand 4 and the hand 5a is driven by a spring and that the rotary movement of each shaft is controlled by an escapement mechanism.

The switch 57' consists of a pair of resilient metal strips having related contacts, the free ends of the strips being arranged to engage a cam 57b' fixed to the shaft 40 and controlling the relative movement of the strips to effect the engagement and disengagement of the contacts thereon. Any preferred form of switch may be employed, that shown forming the subject-matter of our co-pending application filed April 27, 1939, Serial No. 270,294, now Letters Patent No. 2,254,661, dated September 2, 1941, for which reason no claim is made herein thereto. Reference may be made to our aforesaid patent for a more detailed illustration and description of the switch 57'.

*Operation.*—When the vehicle is at rest, the circuit 35 is open and the circuit 42a will open at the end of the predetermined time period to permit closing of the auxiliary circuit 56 through the switch 60a, so that the switch 57' will operate to open and close the latter circuit to energize and de-energize the coil of the magnet 61, and thus record the excess time duration of the stop. However, when the driver has finished his work day period and the vehicle is to be stored or parked, it is desirable to open the circuit 56 and stop the movement of the hands 5, 5a. For this purpose, we provide within the casing 2a in the circuit 56 a seperate normally closed switch 66 (see Figs. 5, 7 and 16), which is automatically operated to open position when the shaft 13 geared to the hand 4 is rotated to move the hand to the "0" position. The switch 66 may consist of a pair of resilient strips having contacts which are normally engaged (see Fig. 16), but disengaged by the movement to "0" position of the arm 6b which is fixed to the shaft 6 for the hand 4. One strip of the switch 66 has an extension 66a, which is engaged and swung laterally by the arm 6b in its movement to "0" position against the adjacent stop 6c, such movement of the strip serving to disengage the contacts carried by the strips and thereby making the switch 57' ineffective to energize and de-energize the coil of the magnet 61, and movement of the arm 6b in the opposite direction serving to release the extension 66a and permit closing of the switch 66. As already described, the travel of the vehicle following each stop in excess of the predetermined time period, far enough to operate the switch 34, effects closing of the circuit 42a and movement of the armature 54a from its normal position to its operated position, as shown in Fig. 16, such movement serving to operate the escapement mechanism 57 and move the hand 4 approximately one half the distance between adjacent graduations 4b. Accordingly, if the hand 4 has been returned to "0" position, the operation of the armature 54a into engagement with the magnet 54 will effect an initial movement of the hand 4 toward the first graduation, so that the arm 6b, which will move a like distance away from its stop 6c, will release the extension 66a and permit the switch 66 to close, and hence make the circuit 56 effective through the switch 60a upon the release of the armature 54a and movement thereof to its normal position. It will thus be seen that after the hand 4 has been returned to "0" position and immediately following the commencement of vehicle travel, that is, travel the predetermined distance provided for by the worm 28 and worm gear 28, the circuit 56 will be closed through the switch 66 for control by the switches 60a and 57'.

Assuming that it is desired to start the vehicle on its trip and the hands 4, 5, 5a, are at their "0" position: upon travel of the vehicle 250 feet or a less distance dependent upon the distance traveled subsequent to the previous operation of the cam 32, the cam will close the circuit 35 and energize the coil of the magnet 43. The magnet 43 through its armatures 43a, 43a' will close the circuit 42a through the contacts 44a, 44a' and swing the arm 48 to the position shown in Figs. 8A and 16 against the stop 50a, whereby the arm 48 through the pawl 53 is connected to the driven ratchet wheel 38a and starts to move in the opposite direction, and the cam 50, which is fixed to the arm 48, will lock the contacts 44a, 44a' in engagement. The closing of the circuit 42a energizes the coil of the magnet 54, the effect of which is to swing the armature 54a from its normal position (see Figs. 4, 5 and 7) to its operated position (see full line position in Fig. 16), thereby opening the auxiliary circuit 56 through the switch 60a (so that the switch 57' is ineffective to close the circuit 56), moving the hand 4 one half the distance to the first graduation through the escapement mechanism 57 and closing the switch 66. If the travel of the vehicle is continued, the switch 34 is closed by the cam 32 and coil of magnet 43 energized each 250 feet of travel, the effect of which is to stop the movement of the arm or lever 48 and swing it back to its operated position against the stop 50a; since this distance between each operation of the cam 32 is traversed in a very short period of time, danger of the arm 48 and cam 50 moving throughout their arc of movement (which requires a predetermined time period dependent upon the adjustment of the cam 50 on the arm 48) before the arm 48 is again operated backwardly against the stop 50a, is avoided. If the vehicle travel is stopped and the stop continues until the cam 50 in the return movement of the arm 48 releases the extension 44 to effect the disengagement of the contacts 44a, 44a', then the coil of magnet 54 is de-energized to permit the armature 54a to swing to its normal position, thereby moving the hand 4 through the escapement mechanism 57 to the first graduation to show that a stop in excess of the predetermined time period has been made and closing the switch 60a, the effect of which is to make the switch 57' effective to close and open the auxiliary circuit 56 and hence energize and de-energize the coil of the magnet 61, thereby operating to oscillate the armature 61a which, through the escapement mechanism 62, permits movement of the hands 5, 5a, to register the duration of the stop in excess of the predetermined time period, until travel of the vehicle is resumed. When vehicle travel again takes place, the switch 34 will close as soon as the vehicle travels 250 feet and through the operation of the predetermined time mechanism 42, close the circuit 42a, which in turn will again swing the armature 54a from its normal position, thereby breaking the auxiliary circuit 56 through the switch 60a. As already set forth, when the switch 60a is opened, the hands 5, 5a, stop moving since the circuit for the coil of the magnet 61 cannot be opened and closed by the switch 57'.

67 indicates a signalling device, such as a lamp, connected by a lead 67a and the lead 56a of the circuit 56 to the post 36, and by leads 67b, 56b, of the circuit 56 to ground 56c. As the circuit for the lamp 67 is closed only when the switch 60a is closed, the lamp is lighted to visually indicate when a stop in excess of the predetermined time limit begins and remains lighted until the switch 60a opens. The circuit for the lamp is preferably connected to the battery and ground, as above set forth to prevent flickering of the light due to operation of the switch 57', but if connected in series or parallel with the coil of magnet 61 in the circuit 56 the lamp may be made to flicker on and off.

In the illustrated form of construction, for sake of simplicity, we provide one clock mechanism, the minute and second hands of which are utilized to control the circuits 42a and 56. However, it will be evident that a separate clock mechanism may be provided and the second hand thereof utilized to operate the switch 57'; in fact each of the shafts 39, 40, may be otherwise driven provided their speed is timed so that the shaft 39 makes one revolution each hour and the shaft 40 makes one revolution each minute.

It will be noted that the time setting mechanism 42, which retards the breaking of the circuit through the contacts 44a, 44a', may be adjusted to suit any desired conditions before operation of the hands 5, 5a, commences. Incidental to this arrangement, it will also be noted that the vehicle may be stopped from time to time, due to traffic lights and other traffic conditions, without affecting the operation of the time setting mechanism.

Figs. 17 to 48, inclusive, show a modified form of mechanism comprising two units, to wit, a primary control means indicated as an entirety at 1', mounted within a casing 1x and an operating mechanism indicated as an entirety at 2' mounted within a casing 2x, which may be supported on the vehicle in any desirable accessible position, for example on a shelf b under the hood c (see Fig. 17).

The primary control means 1' is shown in Figs. 22 to 27 inclusive, its casing 1x being mounted on the side wall of the vehicle transmission housing A for reasons already set forth in connection with the control means 1. The casing 1x is similar in construction to the casing 1a, except that it is provided with an auxiliary enclosure 1x' and parts hereinafter referred to, the outer wall of the enclosure being provided with a hollow externally threaded boss 1a'' for connecting the adjacent end of the speedometer driving shaft (not shown) in position. The control means 1' comprise the following: 23' indicates a shaft having bearing in the inner wall of the casing 1x and outer wall of the enclosure 1x', its inner end being drivingly connected to the driven member 24 of the transmission and its outer end being drivingly connected to the speedometer driving shaft, as already set forth. 28' indicates a worm fixed to the shaft 23' and in mesh with a worm gear 28a' frictionally connected to a shaft 29', which is suitably mounted in bearings 29x, 29x'. The shaft 29' is provided with a sleeve 30' fixed thereto by a pin. That end of the sleeve 30' remote from the bearing 29x' is provided with a concavo-convex plate formed of resilient metal and having radial arms 30x which yieldingly engage the adjacent side face of the worm gear 28a' and normally tend to force the latter into engagement with a pin 30a' on the shaft 29', whereby the worm gear is drivingly connected through the sleeve 30' to the shaft 29', but may slip or rotate thereon when the shaft is locked, as hereinafter set forth, to prevent movement thereof during driving of the vehicle backwardly. A ratchet wheel 31', loosely mounted on the shaft 29', is provided on one side with a cam 32' and on its opposite side with a lateral projection or pin 31a' disposed in the path of movement of a pin 31b' extending radially from the shaft 29', so that in each revolution of the latter, through the engagement of the pin 31b' with the pin 31a', the ratchet wheel 31' and cam 32' are picked up by the shaft and rotated therewith (counter-clockwise as viewed in Fig. 22) a predetermined distance, that is, until a spring 33' (which is connected to one side of the cam) effects a quick rotative movement of the ratchet wheel and cam in the same direction but relative to the shaft. The spring 33' normally tends to hold the ratchet wheel and cam in a predetermined position (see Fig. 22), but permits the pin 31b' to rotate the ratchet wheel and cam with the shaft, to move the spring relative to the shaft 29' to a point on one side of its "dead center" position, thereby putting the spring under tension, so that the spring may operate the cam 32' to its normal position with a quick movement, the purpose of which is to momentarily close a normally open switch 34' in a circuit 35', to which reference will later be made. The active portion of the cam 32' is so arranged angularly of its axis, relative to the connection of the spring 33' with the cam and position of the switch 34', that such portion is in engagement with and operates the switch 34' only during the quick or accelerated movement of the cam, at which time the cam 32' is moving relative to the shaft 29', to prevent the switch being closed or left closed when the vehicle is brought to a stop. The ratchet wheel 31' is alternately engaged by a pair of dogs 35x, 35x, on a rocker 35x', to provide an escapement, which serves to retard the movement of the cam 32' under the influence of the spring 33', whereby the circuit 35' remains closed long enough for the flux to build up in the coil 43' of a magnet 43" (later referred to) connected therein. The dogs 35x and teeth on the ratchet wheel 31' are arranged so as to permit the shaft 29' to turn in one direction— the direction in which it is driven when the vehicle is driven forwardly—and to lock it against turning in the opposite direction, so that the shaft 29' does not turn when the vehicle is driven backwardly. It will thus be seen that in each revolution of the shaft 29' the circuit 35' is closed and opened. The gear ratio between the worm 28' and worm gear 28a' is such that the shaft 29' makes one revolution upon the driving of the vehicle a predetermined distance, for example, 250 feet. Accordingly, the switch 34' is operated and the circuit 35' is closed and opened in each 250 feet of travel of the vehicle. The switch 34' preferably consists of a pair of resilient metallic strips having related contacts and mounted in a block of insulation material, one strip being connected by a lead 35b to one end of the coil 43', and a lead 35c from the other end of the coil being connected to a lead 35c' which is connected to a contact member 36' (preferably on the starter post—see Fig. 48); and the latter in turn is connected by a lead 36a' to the positive side of a battery 37', the negative side of the battery being grounded. The other strip of the switch 34' is grounded. The parts of the control means 1' so far described are similar to like parts shown and described in connection with the first form of construction (Figs. 1 to 16, inclusive).

As later set forth, the operating mechanism 2' is arranged to print (a) the time each time the vehicle travel commences and the time each time the vehicle is brought to a stop and (b) the mileage when these operations take place. Therefore, in this form of construction, it is unnecessary visually or otherwise to show the excess period of time occupied in each stop or the total of such excess time during a work day, but it is necessary to operate the mileage printing devices during vehicle travel and to prevent their operation when the vehicle is parked, stopped, at rest between work day periods, or otherwise not in use. Accordingly, the closing of a circuit by the cam operated switch (34'), instead of throwing out of operation a step-by-step controlled means to prevent its operation during vehicle travel and each predetermined time period as provided for in the form of construction shown in Figs. 1 to 16, connects in a step-by-step means, namely, the means to operate the mileage printing devices step-by-step during vehicle travel by a driven member of the vehicle. By preference we utilize the driven member 24 (already referred to) in the following manner: 68 indicates a worm fixed to the sleeve 30' and in mesh with a worm gear 68a, which is fixed to or formed integral with one end of a shaft 69, the latter being mounted intermediate its ends in a bearing provided on the cover 1" for the casing 1x (see Fig. 26). The opposite end of the shaft 69 is provided with a cam 69a (see Figs. 27 and 48) arranged to control the operation of a normally open switch 70, which is closed and opened by the cam once in each revolution of the shaft 69 to close and open a circuit 71 (later referred to). The gearing 28', 28a', 68, 68a, is arranged to rotate the shaft 69 once for each traveled mile, for reasons which will later be apparent. The switch 70 and the cam 69a for operating it are preferably similar in construction and operation to the switch and cam disclosed and claimed in our aforesaid patent. One terminal strip of the switch 70 is connected by a lead 70a to the lead 35c' and the other terminal strip of the switch is connected by a lead 71a of the circuit 71 to one end of the coil 72 of an electro-magnet 72' (later referred to) and from the opposite end of the coil by a lead 107 to one contact 73 of a switch 73', the other contact 73a of which is grounded, as shown at 73".

74 indicates as an entirety a switch for controlling a circuit 74', mounted in the enclosure 1x' and having a movable member 74a (which is grounded) arranged to be operated in one direction endwise of the shaft 23' by a suitable governor 75 also mounted in the enclosure 1x' and connected to and operated by the shaft 23', so that in the event the vehicle is driven at or above a predetermined speed limit, such abnormal operation will be recorded, as hereinafter set forth, upon a paper web 76 delivered from a roll thereof, the roll web being mounted on a shaft 76' removably supported on a frame 77 (see Fig. 29). The other member of the switch 74 comprises an annular plate 74b, supported on but insulated from the cover 1" and other parts, connected by a lead 78 to one end of the coil 79 of an electro-magnet 79' and from the other end of the coil by a lead 80 connected to the lead 35c'. The movable switch member 74a comprises a disk formed with an opening through which the shaft 23' extends, and having a face plate (which is grounded) formed of conductor material arranged to engage and disengage the plate 74b, the disk being supported by a plurality of resilient arms 81 connected to a plate suitably fixed to the cover 1". The arms 81 normally tend to move the disk 74a outwardly (toward the left as viewed in Fig. 22) and through it to swing the weighted arms 75a of the governor 75 (which arms are pivoted on a collar fixed to the shaft 23') toward each other; the arms 81 normally tend to maintain the switch member 74a out of engagement with the switch member 74b during driving of the vehicle at speeds below the predetermined speed limit, but to permit engagement of the disk therewith under the action of the governor when such limit is reached, to close the circuit 74', whereby such abnormal operation is recorded as later set forth.

The casing 2x for the operating mechanism 2' preferably comprises a lower section 2x' and an upper section 2x" which may be connected to the lower section in any desired manner, and such connections may include a suitable seal to prevent unauthorized access to the mechanism. One side wall of the casing section 2x" is provided with a glass enclosed dial or clock face 2b, relative to which hour and minute hands 2c, 2c', respectively, move to indicate the time, the hands 2c, 2c', being driven as later set forth. The clock face and hands are provided so that the time is visible where the casing 2' is mounted on the vehicle in full view.

The operating mechanism 2' is provided with a plurality of disks, indicated as an entirety at 82, loosely mounted on a shaft 83, and carrying printing numerals to indicate the miles traveled during operation of the vehicle. The shaft 83 is suitably supported by plates 83a rigidly connected in spaced relation. The disks 82 are interconnected so that when the first disk carrying the 10 digits rotates one revolution step-by-step the next disk is moved one step, said next disk and each adjacent disk being operated in the same manner. As this form of construction is well known, it is not illustrated and described in detail. The disks 82 are set and related so that each time a platen 84 is operated (as later set forth), those numbers on the disks in opposed relation to the platen operate through a web provided with a transfer medium, preferably an inked ribbon 85, to print the mileage on the web 76 (see Fig. 49).

86 indicates as an entirety a plurality of disks, also loosely mounted on the shaft 83, carrying printing characters to indicate the time by minutes, hours, a. m. and p. m. The disks 86 are set and related so that each time the platen 84 is operated those characters on the disks in opposed relation to the platen operate through the ribbon 85 to print the time on the web 76 (see Fig. 49). The disks 86 are interconnected so that when the first disk, which carries the characters indicating minutes, rotates one revolution step-by-step, the next disk is moved one step, said next disk and each adjacent disk being operated in the same manner. As this form of construction is well known, it is not illustrated and described in detail.

38' indicates a suitable clock mechanism, the operation of which controls (a) the opening of the circuit 71, and (b) the closing and opening of a circuit 87, in the manner hereinafter set forth. The clock mechanism 38' being of standard construction, only a portion thereof is shown (see Fig. 39). The clock mechanism may be manually wound, but to insure its continuous operation, we have by preference illustrated a clock mechanism which is automatically wound by an electro-magnet 88 (see Fig. 48), shown connected to a lead of one of the circuits (for example, the circuit 87) and grounded at 88'. As such winding means for a clock mechanism is well known, the detail construction and controlling devices for the energization and de-energization of the electro-magnet 88 are not shown. As shown, that shaft 39' of the clock mechanism, which makes one revolution in 60 minutes (hereinafter referred to as the minute hand shaft) is utilized to open the circuit 71 at the end of a predetermined time period when the vehicle is brought to a stop and that shaft 40' of the clock mechanism which makes one revolution each minute (hereinafter referred to as the second hand shaft) is utilized to control the circuit 87.

In the illustrated embodiment, for sake of simplicity, one clock mechanism is provided, but as will be evident from the following description, separate clock mechanisms may be employed and the minute hand shaft of one mechanism utilized to open the circuit 71 and the second hand shaft of the other mechanism utilized to control the circuit 87; furthermore, these circuits may be controlled by shafts driven in any desired manner provided they are timed correspondingly to the shafts 39', 40'.

The second hand shaft 40' is provided with a cam 89 which, in each revolution thereof, closes and opens a switch 89' for the circuit 87. The switch 89' and the cam 89 for operating it are preferably similar in construction to that shown in our aforesaid patent. The circuit 87 comprises a lead 90 connected to one terminal member of the switch 89' and the lead 35c' and a lead 90' connected to the other terminal member of the switch 89' and one end of the coil 91 of an electro-magnet 91', the other end of the coil being grounded (see Fig. 48). Each time the circuit 87 is closed, the electro-magnet 91' serves to operate the time disks, in the following manner, that is, the disk carrying the minute character is operated one step. The armature 91a of the magnet 91' is pivoted on a shaft 91b which is supported by the adjacent plate 83a and an intermediate plate 83a'. The armature 91a is provided with an arm 91c to which is connected a spring 92 normally tending to swing the armature 91a away from the magnet 91' (see Figs. 19 and 29). The arm 91c is pivoted to one end of a link 93, the opposite end of which is pivoted to a link 93a mounted to swing on a shaft 94. The link 93a is provided with a pivoted dog 93a' arranged to engage and operate a ratchet wheel 94a fixed to the shaft 94, the dog being normally pressed toward the ratchet wheel by a suitable spring 93x. It will thus be seen that each time the coil of the magnet 91' is energized, the arm 91c through the links 93, 93a, and dog 93a', will operate the ratchet wheel 94a the distance of one tooth. The shaft 94 is provided with a disk 95 (see Fig. 36) which is formed on its periphery with clutch elements arranged to be detachably engaged by a clutch element 96 extending laterally from a gear 96a, the gear 96a being in mesh with a gear 97 fixed to the adjacent time printing disk 86. As shown in Fig. 35, the gear 97 is wide enough to permit movement of the gear 96a laterally while in mesh therewith to disengage the clutch element 96 from the clutch elements on the disk 95, which disengagement takes place when the time printing disks 86 are re-set, as later set forth. From the foregoing description it will be noted that the clock mechanism 38' runs continuously and in each revolution of its second hand shaft 40', it operates through the switch 89' to close and open the circuit 87, so that the magnet 91' operates each minute to move the time printing disks 86, independently of the travel of the vehicle; accordingly, each time travel commences and ceases, the time thereof is printed on the paper web 76, thus showing the period occupied in vehicle travel between stops and the duration of each stop. A detent 98 is pivoted on the adjacent plate 83a and carries at its outer end a roller 98' arranged to ride the teeth of the ratchet wheel 94a, the detent being normally biased by a spring 98a toward the ratchet wheel 94a (see Fig. 19) to maintain the roller engaged with the teeth thereof to prevent over-run movement of the ratchet wheel and yieldingly lock it in each operated position. The gear 96a is fixed to a sleeve 99, slidably fitting the shaft 94, and provided with a pinion 99a, which through a gear train 100 (see Figs. 21, 29 and 32) rotates the shaft 100a' carrying the minute hand 2c', the shaft 100a being drivingly connected by back-gearing 101 to the sleeve shaft 101a carrying the hour hand 2c.

The circuit 35' when closed, as already described, serves to operate a time setting mechanism indicated as an entirety at 102 (see Figs. 39, 40, 40A, 41, 42 and 43), which in turn controls the closing and opening of the circuit 71, whereby the switch 70, when said circuit is closed, is effective to close and open the circuit and through the coil 72 connected therein to operate the mileage printing disks 82. The mechanism 102 consists of the following: 103 indicates a ratchet wheel fixed to the shaft 39' which makes one revolution each hour. 43" indicates an electromagnet (already referred to) having armatures 104, 104a, at its opposite ends; the coil 43' of the magnet being connected in the circuit 35', is energized each time the switch 34' is closed. The armature 104a, which is pivoted at 104a', is provided with an extension 105 preferably formed of resilient metal grounded as shown in Fig. 48 and carrying the contact 73a arranged to engage the contact 73, which is provided on a bracket 106, connected to the lead 107 of the circuit 71, the switch 70 being effective to close and open the circuit only when the contacts 73, 73a, are engaged. The armature 104, which is pivoted at 104', is provided with an extension 108, the latter in turn being connected by a link 108a to a lever 109 fulcrumed on the shaft 39' (see Fig. 43). A spring 105a connected to the extension 105 normally serves to swing the armature 104a to the position shown in Fig. 40 (in which position the contacts 73, 73a, are disengaged to open the circuit 71), such movement of the armature being limited by the engagement of a wing 110 on the extension 105 with the low portion of a cam 111 (later referred to); and a spring 109a connected to the tail of the lever 109 normally operates through the lever, link 108a and extension 108 to swing the armature 104 outwardly, as shown in Fig. 40, with the extension 108 against a stop 112. 113 indicates a dog pivoted at 113a on the inner face of the lever 109 and normally biased into engagement with the ratchet wheel 103 by a leaf spring 113b (see Fig. 41). Upon energizing of the coil 43' of the electro-magnet 43", the armature 104a swings the outer end of the extension 105 downwardly (as shown in Figs. 39, 40A, 41 and 48) to close the circuit 71 through the contacts 73, 73a, and the armature 104 through the extension 108 and link 108a swings the lever 109 and rotates the cam 111 (which is fixed to the lever 109—see Fig. 43) to the position shown in Figs. 40A, 41 and 48. The armature 104a is arranged to operate in advance of the armature 104, so that the wing 110 will clear the high portion of the cam 111 in the movement thereof to the Fig. 40A position as above set forth. It will be understood that when the lever 109 is in its normal position with the extension 108 against the stop 112 (see Fig. 40), the dog 113 rides the teeth of the ratchet wheel 103 (which is rotating clockwise as viewed in Figs. 40, 40A, and 42), since the lever 109 is held against movement by the stop 112, but when the lever 109 is swung to the position shown in Figs. 40A and 48, the dog 113 is effective to connect the lever 109 to the ratchet wheel 103, so that the latter operates to return the lever 109 to its normal position. When the cam 111 is rotated to the position shown in Fig. 40A, the high portion 111' thereof is in operative relation to the wing 110 so that during vehicle travel, notwithstanding the de-energization of the coil of the magnet 43", between the intermittent operations of the cam 32', the high portion 111' prevents upward movement of the extension 105 and breaking of the circuit 71 through the contacts 73, 73a, until the high portion 111' in the return movement of the cam 111 has moved beyond the wing 110. In the illustrated arrangement, the stops 112, 112a, for the lever 109 are arranged to limit its swinging movement through an arc having a length requiring the maximum time period that may be permitted for the lever to swing with the ratchet wheel 103 (when connected thereto by the dog 113) toward its normal position; accordingly, by proper angular adjustment of the cam 111 on the lever 109 about the axis of the shaft 39', the high portion 111' of the cam 111 will operate through the wing 110 to hold the contacts 73, 73a, engaged throughout this maximum period of time or for a shorter predetermined time period, dependent upon the time required for the high portion 111' to move with the lever 109 relative to the wing 110 (according to the adjustment of the cam 111) clockwise and release the extension 105 for movement upwardly under the influence of the spring 105a during movement of the lever 109 to its normal position thereof. In the arrangement shown, the cam 111 is adjusted so that its high portion 111' releases the wing 110 prior to the lever 109 reaching the limit of its movement by the engagement of the extension 108 with the stop 112; that is to say, the cam 111 is adjustably fixed on the lever 109 relative to the ratchet wheel 103 so that it takes ten minutes for the high portion 111' of the cam to move with the ratchet wheel from the Fig. 40A position to the point where it releases the wing 110.

From the foregoing description it will be noted that upon starting vehicle travel and driving a predetermined distance (250 feet) the circuit 35' will be closed so as to energize the magnet 43" and effect positioning of the lever 109 as shown in Figs. 40A and 41; and as the circuit 35' is immediately opened to de-energize the magnet 43" the lever 109 is free for movement with the ratchet wheel 103. As the circuit 35' is closed in each 250 feet of vehicle travel, the lever 109 will be returned to its operated position (Fig. 40A) each time the coil of magnet 43" is energized, and as it takes ten minutes for the cam portion 111' to move to the point where it releases the wing 110, a time period in excess of time required for the vehicle to travel 250 feet, the contacts 73, 73a, will remain engaged so long as the vehicle is in motion; also, as the driving of the vehicle drives the shaft 69, which is geared to the driven member 24 to make one revolution for each mile traversed by the vehicle, the cam 69a thereon will operate the switch 70 and close the circuit 71 each traveled mile. As the closing of the circuit 71 energizes and de-energizes the coil 72 of the magnet 72' and as the latter operates the mileage printing disks 82, it will be seen that the mileage is accumulated mile-by-mile ready for recording on the paper web 76. When the vehicle is brought to a stop, the shafts 29' and 69 stop rotating and accordingly the operation of the disks 82 ceases. Also, as the circuit 35' can only be closed during the vehicle travel (as already set forth)—the coil 43' of the magnet 43" therefore being deenergized—the lever 109 will return to its normal position; and during this movement of the lever 109 the cam 111, at the end of the time period as determined by the angular adjustment of the cam 111, will release the wing 110 and effect a disengagement of the contacts 73, 73a, to break the circuit 71.

In this arrangement, it will be noted that the vehicle may be stopped from time to time, due to traffic lights and other traffic conditions, without breaking the circuit 71 and during such stops since the shafts 29' and 69 do not rotate the mileage printing disks 82 are not operated.

The magnet 72' effects operation of the mileage printing disks 82 by the following devices: 114 indicates the armature for the electro-magnet 72', pivoted at 114a and provided with an arm 115, the arm 115 being connected to a spring 115a which normally tends to swing the armature 114 away from the magnet 72'. The outer end of the arm 115 is pivotally connected to one end of a link 116 the opposite end of which is pivotally connected to a link 116a, swingable about the shaft 83 (see Fig. 31). The link 116a is provided with a dog 117 which is engaged by a spring 117a, the latter normally maintaining the dog in engagement with a ratchet wheel 118, so that in each swinging movement of the link 116a the ratchet wheel 118 is rotated the distance of one tooth. As the adjacent or first mileage printing disk is fixed to and rotates with the ratchet wheel 118, and carries on its periphery nine numbers seriatim and "0" in the form of printing characters each corresponding to one tooth (there being 10 teeth on the ratchet wheel), it will be seen that each time the coil 72 is energized the armature 114, through the arm 115, links 116, 116a, dog 117 and ratchet wheel 118, will move the adjacent mileage printing disk 82 one step to indicate or register one traveled mile.

119 indicates a detent suitably pivoted on the plate 83a' and carrying at its free end a roller 119' arranged to ride the teeth of the ratchet wheel 118 as the latter rotates. The detent 119 is engaged by a spring 120, which normally tends to press the roller 119' into engagement with the teeth of the ratchet wheel 118 to yieldingly hold the latter in each operated position, and to prevent its overun in each operation by the dog 117.

121 indicates as an entirety the means for operating and controlling the platen 84, whereby the characters on the mileage printing devices or disks 82 and the characters on the time printing devices or disks 86 are printed on the web 76, these means being inter-related to the means for operating step-by-step the mileage printing devices, so that the movement of the platen 84 to effect printing takes place, that is, is predetermined to effect printing at the time vehicle travel commences and at the time vehicle travel ceases. As already set forth, when the vehicle is or has been parked for a period of time greater than that for which the mechanism 102 is set to open the circuit 71, the circuits 35' and 71 are open, and when vehicle travel commences these circuits remain open until the vehicle has been driven 250 feet or less (dependent upon the distance traversed following the closing of the switch 34' prior to the last stop); accordingly, when vehicle travel commences, as soon as the vehicle has been driven far enough to cause the cam 32' to close the switch 34', the printing operation takes place to print the mileage then accumulated on the disks 82 and the time by the disks 86. The platen operating and controlling means 121 comprise the following: 122 indicates a suitable electric motor connected to an auxiliary circuit 122' and supported within the lower casing section 2x' by brackets 123 depending from the bottom wall of the section 2x'' (see Fig. 28A). The motor shaft is provided with a worm 124, in mesh with a worm gear 124a, which is fixed to the lower end of a shaft 125 having bearing in and extending through the bottom of the casing 2x''. The upper end of the shaft 125 is provided with a worm 125a, in mesh with a worm gear 125b, which is fixed to a shaft 126, the latter shaft being mounted in standards 126a. The worm gear 125b is provided on one side with a crank pin 127, which operates through a linkage 128 to raise and lower the platen 84 so as to press the platen against the printing characters, on the mileage and time disks with the web 76 and ribbon 85 interposed therebetween; the motor 122 being controlled to rotate the shaft 126 and operate the platen each time vehicle travel commences and ceases. The auxiliary circuit 122' consists of a lead 122a connecting the lead 35c' to a lead 122a' which is connected to one field of the motor and to one end of the coil 122b of an electro-magnet 122b', the other end of the coil being connected by a lead 122c to the lead 107 of the circuit 71. The other field of the motor 122 is connected by a lead 122d to a conductor fixed to the pivoted armature 122x of the electro-magnet 122b', the armature having an extension 127x carrying on its free end portion a contact 127a arranged between spaced grounded contacts 129, 129a, so that when the coil 122b is energized to attract the armature the auxiliary circuit is completed through the contact 129a and when the coil 122b is de-energized to permit the armature 122x to swing away from the magnet under the influence of a spring 122e the auxiliary circuit is completed through the contact 129. When the auxiliary circuit is completed through either contact, as just set forth, the motor 122 is driven to rotate the shaft 126, but due to the operation of circuit breaking devices (later referred to) the armature 122x is moved from its then operated position toward its other position, the effect of which is to break the auxiliary circuit and stop the rotation of the shaft 126, the circuit breaking devices being operatively connected to the shaft 126 and controlled thereby to break the circuit when the shaft has made one revolution. Accordingly, each time the shaft 126 makes one revolution, the platen 84 is raised to effect printing on the web and lowered. The linkage 128 consists of a crank arm 128a rotatably fitting at its lower end the crank pin 127 and pivotally connected at its upper end to a link 128b, which in turn is pivotally connected to a rod 130, the opposite ends of the rod 130 having bearing in openings formed in the outer ends of a pair of rockers 131 disposed on opposite sides of the platen and pivotally mounted intermediate their ends on stud shafts 131a projecting inwardly from the side members of the frame 77 (see Figs. 18, 19, 44 and 45). The outer end portions of the rockers 131 are connected by suitable screws to the opposite ends of a shaft 132 on which the platen 84 rotates (see Fig. 34). As shown in Fig. 29, the web 76 unwinds from its coil and passes around a roller 133, the shaft 133a of which is supported by the side members of a U-member (later referred to), and then over the upper portion of the platen 84, being guided on and around such portion by rollers 134, 134, which are spaced at opposite sides of the printing position and rotate on shafts 134a, and from the platen the web 76 is delivered through a chute 135 opening exteriorly of the casing 2x, whereby portions of the web may be torn off from time to time. The shafts 134a are mounted at their opposite ends in elongated openings 134a' formed in the rockers 131. The platen 84 is automatically rotated a predetermined distance in each raising and lowering operation thereof, for feeding the web forwardly. For this purpose we provide the platen 84 with a ratchet wheel 136 (Fig. 19) arranged to be engaged by a pawl or dog 136a the pivot for which is supported independently of the rockers 131, so as to effect rotation of the platen 84 as it moves upwardly, whereby the web, due to the engagement of the rollers 134 therewith, moves with the platen. To effect engagement of the rollers 134 with the web 76 and press it against the platen to insure movement of the web therewith, the opposite ends of their shafts are connected to springs 137 (suitably anchored to the rockers 131) which normally tend to press the web 76 against the periphery of the platen, whereby the web is fed forwardly by the latter. A detent 138 pivotally mounted on the rocker adjacent to the ratchet wheel 136 and carrying on its outer end a roller 138' and normally urged by a spring 138a into yielding engagement with the ratchet wheel teeth, serves to prevent over-run of the ratchet wheel 136 when operated by the pawl 136a and maintain the platen in each operated position. The pawl or dog 136a is pivotally mounted on one side portion 139 of a U-member 139' (see Figs. 19, 29, 44 and 45), which is fulcrumed on the shaft 133a, its other side portion 139a being connected to a mechanism, indicated as an entirety at 140 (see Figs. 18, 44 and 45), for feeding the inked ribbon 85 step-by-step, as later set forth. The U-member 139' is operatively connected to the rod 130 for operation thereby simultaneously with the operation of the rockers 131 to operate the ribbon feed mechanism 140. As the U-member 139' is fulcrumed on an axis different from the axis for the rockers 131, the outer end portions of the latter and side portions 139, 139a, of the member 139' move relative to each other when operated by the rod 130, so that the pawl 136a is effective to engage the ratchet wheel 136 and rotate the platen 84. A spring 136b, also mounted on the side portion 139, in engagement with the pawl 136a, normally tends to hold the latter in operative relation to the teeth of the ratchet wheel 136. For the purpose of connecting the rod 130 to the U-member 139', the side portions 139, 139a, of the latter are formed with alined elongated openings 139b through which the rod 130 extends so as to engage with and slide on the side walls of the openings 139b, the effect of which is to rock the U-member 139'.

141 indicates as an entirety the circuit breaking devices operated by the shaft 126 and cooperatively related to the armature 122x, for controlling the engagement of the contact 127a with and disengagement from each of the contacts 129, 129a (see Figs. 28 and 28A). Of these devices 141, 142 indicates a pinion fixed to the shaft 126 and meshing with a gear 142a which is fixed to a stud shaft 143 suitably supported at its inner end on the adjacent standard 126a. The outer end of the shaft 143 is provided with an eccentric 144 arranged to revolve within and engage the walls of an elongated opening 144a formed in an arm 145 pivoted at its lower end on a bracket 146 (see Fig. 28A), the pinion 142 and gear 142a having a two-to-one ratio, so that when the shaft 126 makes one revolution the arm 145 is swung by the eccentric 144 from one extreme position to its other extreme position. At its upper end, the arm 145 is provided with a member 147 on which are supported spaced stops 148, 148a (see Fig. 28), arranged to be engaged by a member 149 fixed to and projecting upwardly from the armature 122x between the stops. In the swinging movement of the arm 145 to the position shown in Figs. 18 and 28A it operates through the stop 148a and projecting member 149 to swing the armature 122x away from its magnet 122b' to a position substantially midway of the contacts 129, 129a, in opposition to the energized coil 122b thereof and thus break the circuit 122' through the contacts 127a, 129a, the member 149 being held against the stop 148a by the magnetic influence of the coil until the coil is de-energized, whereupon the spring 122e will swing these parts and effect engagement of the contact 127a with the contact 129; and upon swinging movement of the arm 145 to its other position it operates through the stop 148 and projecting member 149 to swing the armature 122x toward the magnet to a position substantially midway of the contacts 129, 129a, in opposition to the spring 122e and thus break the circuit 122' through the contacts 127a, 129, the member being held against the stop 148 by the spring 122e, until the coil 122b is energized, whereupon the coil will swing these parts and effect engagement of the contact 127a with the contact 129a. The supporting member 147 is preferably formed with an elongated opening through which the reduced end of each stop 148, 148a, extends for engagement with a clamping nut for adjustably securing the stop to the member 147. The opening permits each stop 148, 148a, to be secured to it by a washer and nut and to be adjustably fixed thereto.

Figs. 18, 19, 28A and 48 show the position of the circuit breaking devices 141 after vehicle travel commences. As will be understood from Fig. 48, the coil 122b of the magnet 122b' is energized, and remains energized so long as vehicle travel continues and switch 73' remains closed, but in the movement of the arm 145 to its left hand position, as viewed in these figures, the stop 148a has engaged with and moved the member 149 and through the latter moved the armature 122x outwardly and effected a breaking of the circuit 122' through the contacts 127a, 129a. If vehicle travel ceases and the circuit is opened through the switch 73', the coil 122b is de-energized, which permits the spring 122e to swing the armature 122x, member 149 and arm 127x to their extreme position away from the magnet and causes engagement of the contact 127a with the contact 129. The circuit 122' is then closed to operate the motor 122 and effect a printing operation. The operation of the motor 122 serves to swing the arm 145 to its other position (see dotted position in Fig. 28A), the arm in turn moving the member 147, armature and arm 127x in opposition to the spring 122e to break the circuit through the contacts 127a, 129, to stop the motor after the shaft 126 has made one revolution. When vehicle travel again commences, the coil 122b is energized and swings the armature 122x, member 149 and arm 127 to their other position to effect engagement of the contact 127a with the contact 129a to again close the circuit 122'. The motor 122 is then operated to effect a printing operation, the operation of the motor serving to swing the arm 145 to its first position (Figs. 18 and 28), whereby the contact 127a disengages the contact 129a to break the circuit 122'. It will thus be seen (a) that each time vehicle travel commences the circuit 122' is first closed to operate the motor, which in turn through the linkage operates the platen to effect printing and then opened and (b) that each time vehicle travel ceases the circuit 122' is first closed to operate the motor, which in turn through the linkage operates the platen to effect printing, and then opened. However, when vehicle travel ceases, it will be noted that the circuit is not broken through the contacts 73, 73a, until the arm 105 is released, so that vehicle stops, due to traffic conditions, may be made without operating the motor 122 and effecting a printing operation.

The inked ribbon 85 is mounted on spools or reels 150, 150', of any desired construction and suitably mounted for rotation in the walls 83a, the ribbon being unwound from one spool and wound on the other spool step-by-step and then automatically reversed for step-by-step movement in the opposite direction, being guided below the disks 82 and 86 by rolls 150a. The ribbon feed mechanism 140 consists of the following: 151 indicates a plate having lateral arms 151a at its upper end. The plate is formed with vertically disposed slots through which headed pins 152 mounted in the front wall 83a and the shaft 83 extend, the shaft 83 and pins 152 serving as guides for the plate 151 to permit it to slide up and down on the adjacent wall 83a (see Figs. 44, 45 and 46). The lower end of the plate 151 is provided with an outwardly extending lug 153 formed with an opening through which loosely and slidably extends a screw 153a threaded into a lug 154 pivotally mounted on the adjacent side portion 139a of the U-member 139'. A spring 155 coiled around the screw 153a and interposed between the lugs 153, 154, serves to transmit the movement of the U-member 139' to the plate 151 to raise it, whereas the screw connects the lugs together so as to move the plate 151 downwardly. The screw 153 provides a pivotal or swivel connection between the plate 151 and U-member, so that the latter may swing about its fulcrum, whereas the spring 155 permits excess movement of the U-member 139' as compared to the movement of the plate 151, as limited by the slot for the shaft 83 or the slots for the guide pins 152. The arms 151a are provided with pivoted pawls 156, each arranged to engage a ratchet wheel 157 on the end of the adjacent ribbon spool 150. 158 indicates a bar to which the pawls are pivoted for connecting them together. The bar 158 is formed with horizontally disposed slots through which pins 159, carried by the plate 151, extend and permit the bar to be moved endwise horizontally, so that when the bar is moved in one direction, as limited by the end walls of the slots, one pawl 156 is so related to the adjacent ratchet wheel 157 that in each downward movement of the plate 151 the pawl engages the adjacent ratchet wheel to move it one step and thus feed the ribbon 85 in one direction, whereas the other pawl is held in an inoperative relation to the adjacent ratchet wheel 157, and when the bar 158 is moved in the opposition direction, as limited by the end walls of the slots, the positions of the pawls 156 are reversed to feed the ribbon in the opposite direction. The bar 158 is operated from one position to its other position by the following devices: 159x indicates a presser formed with elongated slots 159a through which extend pins 160 to slidably support the presser on the inner face of the wall 83a which carries the plate 151. The presser 159x is connected to a spring 161 which normally tends to maintain the foot portion 159' of the presser in yielding engagement with the ribbon on one spool (spool 150 as shown in Fig. 47), so that as the ribbon unwinds from the spool 150 the presser 159x moves in one direction, toward the spool, under the influence of the spring 161 and when the ribbon winds on the spool 150 the presser is moved in the opposite direction in opposition to the spring tension. Intermediate its ends the presser is provided with an inwardly disposed off-set portion the end walls of which form spaced shoulders 162, 162', arranged to be alternately engaged by laterally projecting lugs 163, 163', on the opposite sides of an oscillator 163a. The outer face of the oscillator is provided with an outwardly extending stud shaft 164, which rotates in a sleeve 164a carried by the plate 151, a spring clip 164a' serving to secure the shaft therein. On its inner face and at one side of its axis the oscillator is provided with a lug 165 to which one end of a coiled spring 166 is connected, the opposite end of the spring being connected to a pin 166' fixedly carried by plate 151 and positioned in a vertical plane cutting the axis of the oscillator 163a but on that side of said axis remote from the lug 165, so that the spring tends to rotate the oscillator in one direction or the other accordingly as the longitudinal axis of the spring 166 is disposed in a plane at one side or the other side of the axis of the oscillator 163a. The lower portion of the oscillator is provided with a stop 167 which projects into an opening 167a formed in the plate 151, the engagement of the stop 167 with the walls of the opening 167a serving to limit the oscillatory movement of the oscillator 163a in either direction. The upper portion of the oscillator 163a is provided with an outwardly extending resilient pin 168 which loosely extends through an opening formed in the bar 158 to form a connection with the oscillator, so that the movement of the latter serves to move the bar 158 endwise, the slots for the guide pins 159 being large enough to permit the pin 167 to traverse its arc of movement in moving the bar in either direction. As will be understood from the foregoing description, the oscillator 163a is carried by and moves up and down with the plate 151, and due to the tension of the spring 166, it is maintained in one extreme position or the other, whereby one of the projections 163, 163', is in position to engage the adjacent shoulder 162 or 162' on the presser 159x. As shown in Fig. 47, the ribbon 85 is being wound on the spool 150 and due to its increasing diameter, the presser 159x will be moved endwise toward the left until the shoulder 162' is positioned in the path of movement of the lug 163', following which in the succeeding downward movement of the plate 151 and oscillator 163a, the engagement of the lug 163' with the shoulder 162' will rotate the oscillator to its other position, which operation will (1) shift the bar 158 and thus reverse the positions of the pawls to feed the ribbon in the opposite direction and (2) position the lug 163 for engagement with the shoulder 162 upon movement of the presser toward the right due to the unwinding of the ribbon from the spool 150.

The device for printing a mark (to wit, the numerals 55—see (Fig. 49) on the web 76 to show each time that excessive speed of the vehicle took place, consists of a plunger, indicated as an entirety at 169 (see Figs. 31 and 31A), provided on its lower end with an off-set lug 169' which is provided with the printing character. The plunger 169 is formed in its lower portion with a slot 169a through which the shaft 83 extends and provided at its upper end with bifurcations 169b which engage the side walls of a flanged collar 170 loosely fitting the shaft 100a, the shaft 83 and collar 170 serving to slidably support the plunger 169 on one side of the plate 83a'. A spring 171 suitably anchored at one end to the plate 83a' and connected at its other end to the plunger, such as a lug 171a extending therefrom, normally tends to slide the plunger upwardly into engagement with the collar 170, which serves as a stop therefor. A second lug 172 on the plunger 169 is engaged by the outer end portion of an arm 173 connected at its opposite end to one side of a U-shaped member 173a, which is pivoted on the pin or shaft 114a, the other side of the U-member carrying the armature 79b for the electro-magnet 79'. From the foregoing description it will be understood that when the switch 74 is closed, the coil 79 of the electro-magnet 79' will be energized and attract the armature 79b, which in turn through the arm 173 and lug 172 will project the plunger 169 downwardly and press the ribbon 85 and web 76 against the platen 84 and print on the web the indicating mark on the lower end of the plunger. The plunger 169 will be held in its downward position so long as the speed of the vehicle is maintained at or above the predetermined limit, but as the web 76 and ribbon 85 are stationary, the latter are not damaged.

174 indicates a device for printing on the web 76 a mark (such as the letter "T") each time the time printing disks 86 are rotated to change their setting. The device 174 effects printing on the web 76 whether the setting or resetting of the disks 86 is for the purpose of positioning them at "correct time" or an attempt on the part of the vehicle driver to disguise the time involved at a stop or period of travel. The device 174 is operated by a re-setting mechanism indicated as an entirety at 175 (see Figs. 36, 37 and 38). The device 174 consists of a plunger (see Fig. 33A) provided on its lower end with a printing character 174' and formed with slots 174a, 174b, to respectively receive the shaft 83 and a headed pin 174c which slidably mount the plunger 174 on that side of the plate 83a' remote from the plunger 169. The upper end of the plunger 174 is provided with an arm 174d to which one end of a spring 176 is connected, the other end of the spring being suitably anchored on the plate 83a' and normally tending to maintain the plunger 174 in its uppermost position with the lower end wall of the slot 174b against the pin 174c, which forms a stop therefor. The plunger 174 is operatively connected to a lever 177, the outer end of which is preferably connected by a spring 178 to the arm 174d, the lever 177 being fulcrumed on the plate 83a. The opposite end of the lever 177 is operatively related to a cam 179 (see Fig. 33) which is fixed to the inner end of a rotatable and endwise slidable rod 180, so that (1) in the initial movement of the rod endwise outwardly, the cam 179 operates the lever 177, (2) in the final endwise movement of the rod the gear 96a is disconnected from the disk 95 and drivingly connected to the rod and (3) in the rotary movement of the rod, while in its extended position, the disks 86 are rotated. The rod 180 is slidable in alined openings formed in one of the plates 83a and plate 83a', and by means of a coiled spring 180' interposed between the plate 83a and a collar fixed to the rod, it is normally maintained in its innermost position. The outer end of the rod 180 extends to a point exteriorly of the casing 2x'', its outer exposed end being provided with a knob 180a. To provide for the disconnection of the gear 96a from the clutch disk 95 and driving connection thereof with the rod 180, the sleeve 99 is movable endwise on the shaft 94 against the tension of a coiled spring 181 surrounding the shaft and engaging the inner end of the sleeve, to disengage the clutch element 96a from the disk 95. The sleeve 99 is moved endwise on the shaft 94 against the tension of the spring 181 by a yoke 182 disposed between collars fixedly or integrally connected to the sleeve 99, the yoke 182 being provided on the outer end of an arm 183 which is mounted on an endwise slidable and rotatable member 184, the member extending through and rotatably fitting an opening formed in the arm 183, but provided with devices on opposite sides of the arm arranged to engage therewith so that the arm moves with the member in its endwise movement to move the sleeve when the rod 180 is moved outwardly to its extreme position; the movement of the arm 183 and member 184 in the opposite direction being effected by the spring 181, upon the release and return of the rod 180 under the influence of the spring 180'. The outer end of the member 184 is slidably and rotatably mounted in a bearing 185 mounted in the adjacent wall 83a and the inner end of the member extends through the cam 179 and has bearing in an axially disposed opening 185a, formed in the rod 180, this bearing permitting the rod and member to move relative to each other, whereby in the initial movement of the rod 180 the cam 179 will effect operation of the plunger 174, as already described, and in the further or final movement of the rod 180, by means of a clutch, indicated as an entirety at 186, the rod 180 is connected to the member 184, so that upon rotation of the rod 180 the member is rotated to drive a gear 187 fixed to the member 184. As shown in Fig. 36, the gear 187 is in mesh with and has sliding engagement with the teeth of the pinion 99a, which when driven operates through the gear train 100 to set the hands 2c, 2c', and through the sleeve 99 and gear 96a to set the time printing disks 86. The cam 179 consists of a conical wall, which operates the lever 177 and a cylindrical wall on which the lever rides after it has been operated, the latter wall forming a chamber 179'. The clutch 186 is preferably arranged within the chamber 179' and consists of a plurality of blocks 188 (see Fig. 37) fixed to the inner wall of the chamber 179' and spaced to form radially extending slots and a diametrically disposed pin 189 carried by the member 184 within the chamber 179' and extending laterally from the opposite sides thereof. Accordingly, when the rod 180 is moved outwardly, as already set forth, the related walls of the blocks 188 engage the pin 189 and thus connect together the member 184 and rod, so that upon rotation of the latter the gear 187 will be rotated. The member 184 is provided with a collar 190 arranged to be engaged by the end wall of the cam 179, so that the influence of the spring 181 in returning the sleeve 99 and parts connected thereto to normal position with the clutch element 96 in engagement with the disk 95, is supplemented by the influence of the spring 180' in moving the rod 180 inwardly upon the release of the latter.

Fig. 49 illustrates a form of daily report sheet or card for the salesman driving the vehicle, this form having an area on which is pasted that section of the web 76 on which the vehicle operations for the day are printed, the mileage being shown under the title "Mileage" on the form and the time being shown under the title "Time" on the form. The form also provides spaces to receive the names of the concerns called upon opposite each mileage and time printing record on the web 76 and spaces for other data, the letter "T" on the web indicating that the time printing disks were set and the numerals "55" on the web indicate that the vehicle was driven at or in excess of the predetermined speed limit. At spaced portions the web is printed with numbers seriatim, one such number being indicated at 76, to provide a check, so that the portions of the web cannot be torn off and discarded, except by one so authorized. The web 76 is surfaced with erasure detection means, preferably light parallel lines, which provide a detection in event erasures on the web are attempted.

To those skilled in the art to which our invention relates many changes in construction and widely differing embodiments and applications of the invention will be apparent without departing from the spirit and scope of the invention. Our disclosures and the description herein are purely illustrative and are not intended to be in any sense limiting.

What we claim is:

1. In mechanism of the class described, the combination with a driven vehicle, of a movable device thereon operated by a driven member of the vehicle, a source of current supply, a main circuit connected to said source of current supply, an electro-magnet in said circuit, a separate circuit, an electro-magnet in said separate circuit, a switch for said main circuit arranged to be intermittently operated by said device, a separate switch for opening and closing said separate circuit, a main switch arranged in one operated position thereof to connect said separate circuit to said source of current supply to permit opening and closing of said separate circuit by said separate switch and in its other operated position to disconnect said separate circuit from said source of current supply, whereby said separate switch is ineffective, said first mentioned electro-magnet being arranged to operate said main switch to one operated position, time controlled release mechanism for operating said main switch to its other position, means for intermittently operating said separate switch, whereby, when said separate circuit is connected to said source of current supply, said last mentioned electro-magnet is intermittently energized, and a registering mechanism operated step by step by the electro-magnet in said separate circuit.

2. In mechanism of the class described, the combination with a driven vehicle, of a movable device thereon operated by a driven member of the vehicle, a source of current supply, a main circuit connected to said source of current supply, an electro-magnet in said circuit, a switch for said main circuit arranged to be intermittently operated by said device, for intermittently energizing said electro-magnet, registering mechanism, a separate circuit, a pair of switches for said separate circuit, the operation of one of said switches to one position thereof being controlled by the energization of said electro-magnet, time controlled release means arranged to be set by said electro-magnet and operable when said magnet remains de-energized for a predetermined period of time to operate said switch to its other position, said switch when in one position serving to connect said separate circuit to said source of current supply, means for intermittently operating the other switch, an electro-magnet in said separate circuit arranged to be intermittently energized by the operation of said last mentioned switch when said separate circuit is connected to said source of supply, and means actuated by said last mentioned electro-magnet for operating said registering mechanism.

3. In a mechanism for indicating certain operating conditions of a machine, the combination of a device periodically operated by a driven member of the machine, a registering mechanism, a circuit, an electro-magnet in said circuit, means for intermittently opening and closing said circuit for intermittently energizing the coil of said magnet, means actuated by said electro-magnet for operating said registering mechanism, a switch for said circuit, means controlled by said device for operating said switch in one direction, and time delay mechanism connected to said switch operating means and arranged to be set thereby and operable at the end of a predetermined time period to operate said switch in the opposite direction, the time period between periodic operations of said device being less than the time period set for operation of said time delay mechanism, whereby said switch is maintained in one position during operation of the driven member of the machine.

4. In a mechanism for indicating certain operating conditions of a driven vehicle, the combination of a device operated by a driven member of the vehicle, a registering mechanism carried by the vehicle, electrical means for operating said registering mechanism, said means including a circuit, separate switches therefor and an electro-magnet in the circuit, electrical means for controlling the operation of one of said switches into and out of circuit closing position, said last mentioned electrical means including a circuit and a switch therefor arranged to be intermittently operated by said device, and means for intermittently operating the other switch and arranged to intermittently energize said electro-magnet when said first mentioned switch is in circuit closing position.

5. A mechanism as claimed in claim 4, wherein said device is arranged to operate the last-mentioned switch each time the vehicle moves a predetermined distance and said electrical controlling means includes a time actuated member arranged to break said circuit at the end of a predetermined time period.

6. In mechanism of the class described, the combination with a driven vehicle and a registering mechanism thereon, of electrical means including a circuit for operating said mechanism, a switch for closing said circuit, means for intermittently opening and closing said circuit when said switch is in circuit closing position, a rotatable member, means for rotating said member, means for opening said switch when said member has rotated a predetermined distance, devices between said switch and said member arranged to connect them together for movement with said member when said switch is closed, and means operated by a driven member of the vehicle for closing said switch.

7. In an attachment for a machine, the combination of registering mechanisms, a clock mechanism, electrical means for operating one of said registering mechanisms, including a switch for the circuit for said means, said switch being operated by a shaft of said clock mechanism in each revolution thereof, a separate switch in the circuit for said means and operatively connected to said other registering mechanism for operating it, means for maintaining said separate switch open so long as the machine is running, a resetting means for one of said registering mechanisms, and a cut-out in said circuit operated to open position by said resetting means in moving one of said registering mechanisms to zero position, said cut-out being arranged to close upon the operation of said mechanism from zero position.

8. In mechanism of the class described, the combination with a vehicle having a driven member and a registering mechanism on said vehicle, of an electro-magnet and a circuit therefor, means actuated by said magnet for operating said registering mechanism, a switch in said circuit, means operatively connected with said driven member for operating said switch at predetermined intervals to energize and de-energize the coil of said magnet, make-and-break means for said circuit arranged to close and open the said circuit, whereby when said circuit is closed said switch is effective to open and close said circuit, and means controlled by said driven member for operating said make-and-break means whereby the latter makes said circuit effective and maintains it effective so long as the vehicle is driven.

9. A mechanism as claimed in claim 8 wherein the last mentioned operating means comprises an electric circuit and a switch therefor operated by said driven member and the make-and-break means comprises an electro-magnet in said last mentioned circuit, a separate switch for said first mentioned circuit arranged to be closed by said last mentioned magnet, and time controlled release devices operated into set position by said magnet and operable to open said separate switch.

10. In a mechanism for indicating certain operating conditions of a machine, the combination with a registering mechanism and a source of current supply, of an electro-magnet and a circuit therefor, means for intermittently opening and closing said circuit, means actuated by said magnet each time said circuit is closed, for operating said registering mechanism, a switch arranged to connect said circuit to said source of current supply, and means controlled by a driven element of the machine for maintaining the last-mentioned switch open so long as the machine is operating, the last mentioned means including a time controlled device arranged to maintain the last mentioned switch closed for a predetermined time period after the machine ceases operation.

11. A mechanism as claimed in claim 10 wherein is provided a separate registering mechanism, and means operatively connected to said last-mentioned switch for operating said separate registering mechanism.

12. In a recording mechanism for a vehicle, the combination of mileage registering mechanism provided with printing characters, electrical means for operating said mechanism, a switch for the circuit for said electrical means, means operated by a driven member of said vehicle for operating said switch at end of each mile traveled by the vehicle, make-and-break means for the circuit, means controlled by a driven member of the vehicle for operating said make-and-break means when vehicle travel commences and when vehicle travel ceases, means for supplying a web of paper in operative relation to the printing characters of said registering mechanism, and means controlled by said make-and-break means in each operation thereof for causing printing from said characters on said web.

13. A recording mechanism as claimed in claim 12 wherein are provided means controlled by the driven member of the vehicle for printing a mark on said web when the speed of said driven member reaches a predetermined speed limit.

14. A mechanism as claimed in claim 12 wherein are provided a time recording mechanism provided with printing characters arranged to print the time on said web each time said printing means operates, and means for setting said time recording mechanism.

15. A mechanism as claimed in claim 12 wherein are provided a time recording mechanism provided with printing characters arranged to print the time on said web each time said printing means operates, means for setting said time recording mechanism, and means operated by said setting means for printing a mark on said web in each setting operation.

16. A recording mechanism as claimed in claim 12 wherein said printing means include an electric motor driven member for causing each printing operation and circuits for the motor, one circuit being closed when said make-and-break means operate in one direction and the other circuit being closed when said make-and-break means operate in the opposite direction, and means controlled by the operation of said motor for opening either circuit after the motor has operated the printing means.

17. In a recording mechanism for a vehicle, the combination of mileage registering mechanism provided with printing characters, of electrical means for operating said mechanism, a switch for the circuit for said electrical means, means operated by a driven member of said vehicle for operating said switch at the end of each mile traveled by the vehicle, make-and-break means for the circuit, means controlled by a driven member of the vehicle for operating said make-and-break means, when vehicle travel commences and when vehicle travel ceases, means for supplying a web of paper and an inked ribbon in operative relation to the printing characters of said registering mechanism, a movable platen, means controlled by said make-and-break means in each operation thereof for operating said platen to effect printing on said web, and means operated by said platen for feeding said web and said ribbon.

18. In a mechanism for indicating certain operations of a machine, the combination with a registering mechanism and a clock mechanism, of electrical means for operating said registering mechanism, a switch for the circuit for said electrical means, means for intermittently operating said switch, make-and-break means for the circuit comprising a separate, normally open switch, an electro-magnet, means operated by said magnet for closing said separate switch, a device operated by said magnet and arranged to be set in connected relation to a driven member of said clock mechanism and in engagement with the movable member of said switch for holding it closed while said driven member moves through a predetermined time period, a circuit for said magnet, and a switch for said last-mentioned circuit arranged to be closed by a driven member of the machine, whereby upon operation of the machine the movable member of said separate switch will be released to open the circuit for said electrical means.

19. In a recording mechanism for a machine, the combination with a registering mechanism provided with printing characters, of electrical means for operating said registering mechanism, a switch for the circuit for said electrical means, a separate, normally open switch for the circuit, operated by a driven member of the machine for maintaining said separate switch closed during operation of the machine, means for effecting printing from said characters, a motor for operating said printing means, a circuit for the motor, a separate circuit for the motor connected to a lead of the circuit for said electrical means, an electro-magnet having an armature arranged in one position to close one motor circuit and in its other position to close the other motor circuit, the coil of said magnet being connected in said separate circuit, whereby the armature is operated to one circuit closing position when said separate circuit is closed, and means controlled by said motor for moving the armature from either operated position to break the adjacent motor circuit and stop the motor after it has operated said printing means.

20. In mechanism of the class described, the combination with a vehicle having a driven member, of a main circuit, a switch in said circuit operated intermittently by said member, a separate circuit, switch means in said separate circuit controlled by the closing and opening of said main circuit, an auxiliary circuit, adapted to be alternately connected to said main circuit, a separate switch in said separate circuit, means for intermittently operating said separate switch to intermittently close said separate circuit when said switch means are in circuit closing position, a registering mechanism operated by the intermittent closing of said separate circuit, said intermittently operating means being ineffective when said switch means are in circuit open position, means for connecting said auxiliary circuit to one of said circuits each time said separate circuit is opened and closed, a separate registering mechanism and means actuated by the opening and closing of said auxiliary circuit for operating said separate registering mechanism.

21. A mechanism as claimed in claim 20 wherein the switch means for said separate circuit includes a clock mechanism having a timed actuated member arranged to open said separate circuit at the end of a predetermined time period.

22. In mechanism of the class described, the combination with a machine having a rotatable member arranged to be driven and stopped, and a clock mechanism, of a mechanism having a movable device for indicating stops, a mechanism having movable time indicating devices for indicating the time length of the stops, electrical means, a circuit for said means having a main switch operatively connected to said stop indicating mechanism and a separate switch actuated intermittently by a shaft of said clock mechanism, arranged to operate said time indicating mechanism when said main switch is closed, means controlled by the driving of said rotatable member for moving said main switch to open position, and releasable means arranged to be connected to a shaft of said clock mechanism by said moving means for holding said main switch in open position and arranged to be disconnected from said shaft at the end of a predetermined time period to close said main switch in the event stoppage of said member for such time period takes place.

23. In mechanism of the class described, the combination with a machine having a driven member, of a registering mechanism having printing characters, printing means including a movable platen, means controlled by said driven member for operating said registering mechanism, said operating means including an electric circuit the closing and opening of which is dependent on the starting and stopping of said driven member, an electro-magnet in said circuit, a motor, circuits for said motor, each arranged to be closed by the armature of said magnet when operated to either position, driving connections between the shaft of said motor and said platen for operating the latter, and means operated by said driving connections for moving said armature away from each operated position toward its opposite operated position to break the motor circuit and stop the motor.

24. In mechanism of the class described, the combination with a driven vehicle, a registering mechanism thereon and a clock mechanism, of a main circuit, a relay, the coil of which is connected in said circuit, having two armatures, a switch for said circuit arranged to be intermittently closed and opened by a driven member of said vehicle, electrical means for intermittently operating said registering means, said means including a circuit and a switch arranged when in one predetermined position to permit the operation of said electrical means and in its other position to render said electrical means inoperative, said switch being operatively connected to one of said armatures and operated thereby to close the last mentioned circuit, release elements between a driven member of said clock mechanism and said last mentioned switch, and means operated by the other armature to connect one of the release elements to said clock driven member for movement therewith.

25. In a machine of the class described, the combination with a source of current supply, of a main circuit connected thereto, a separate circuit, a pair of driven members each arranged to intermittently make and break one of said circuits, a switch for connecting said separate circuit to said source of current supply and disconnect it therefrom, a delay release mechanism operatively connected to said switch and arranged to operate it in one direction, an electro-magnet in each circuit, said magnet in said main circuit being arranged to operate said switch in the opposite direction and to set said delay release mechanism for operation when stoppage of the driven member which makes and breaks said main circuit occurs, and a registering mechanism arranged to be operated by the electro-magnet in said separate circuit when said switch is in circuit closing position.

26. In mechanism of the class described, the combination with a vehicle having a driven member, of registering mechanisms thereon, a source of current supply, a circuit, an electro-magnet in said circuit for operating one of said registering mechanisms, a switch for connecting said circuit to said source of current supply, means operatively connecting said switch to the other registering mechanism for operating the latter each time said switch is operated, a separate switch for intermittently opening and closing said circuit when the latter is connected to said source of current supply, whereby said electro-magnet is intermittently energized, and means dependent upon the operation of said driven member for operating said first mentioned switch.

27. In an attachment for a vehicle, the combination with a registering mechanism, of electrical means including a circuit, for operating said mechanism step-by-step, a shaft drivingly connected to a driven member of the vehicle, a switch for said circuit, a device for operating said switch, and means between said shaft and said device for operating the latter in each predetermined distance of travel of the vehicle, said last means including a cam, a spring connected to the cam for normally holding it in a predetermined position, and devices for first rotating the cam about its axis, to put the spring under tension and then release it, whereby the cam is operated with an accelerated motion.

28. In an attachment for a vehicle, the combination with a registering mechanism, of electrical means including a circuit, for operating said mechanism step-by-step, a shaft drivingly connected to a driven member of the vehicle, a switch for said circuit, a device for operating said switch, and means between said shaft and said device for operating the latter in each predetermined distance of travel of the vehicle, said last means including a cam, a spring connected to the cam for normally holding it in a predetermined position, and devices for first rotating the cam about its axis, to put the spring under tension and then release it whereby the cam is operated with an accelerated motion and means controlling the movement of the cam under the influence of said spring.

29. In an attachment for a vehicle, the combination with a registering mechanism, of electrical means including a circuit, for operating said mechanism step-by-step, a shaft drivingly connected to a driven member of the vehicle, a switch for said circuit, a device for operating said switch, and means between said shaft and said device for operating the latter in each predetermined distance of travel of the vehicle, said last means including a cam, a spring connected to the cam for normally holding it in a predetermined position, and devices for first rotating the cam about its axis, to put the spring under tension and then release it whereby the cam is operated with an accelerated motion and means controlling the movement of the cam under the influence of said spring, the last-mentioned means being arranged to lock said operating means against movement during backward travel of the vehicle.

30. A truck operation recorder comprising recording mechanism, automatic means for actuating said recording mechanism after the truck is started, a timing mechanism, means driven thereby, means effective when the truck comes to a stop for initiating the operation of said means driven by said timing mechanism to measure a predetermined time interval, and means effective at the end of said interval for automatically causing the actuation of said recording mechanism.

31. A truck operation recorder comprising recording mechanism, automatic means for actuating said recording mechanism after the truck is started, automatic means for actuating said recording mechanism after said truck has stopped, additional recording means, and means for rendering said additional recording means operative only when said truck is in motion for differentiating between entries made by the stopping and by the starting of said truck.

32. In a recording mechanism, type wheels, electromagnetic means for driving said type wheels including a pawl driven by said electromagnet means, a ratchet wheel for cooperation with said pawl, a shaft for said ratchet wheel, an axially shiftable sleeve mounted on said shaft, clutching means associated with said ratchet wheel and with said axially shiftable sleeve so as to permit rotation of the latter by the former, said type wheels being associated with said axially shiftable sleeve so as to be driven by said ratchet wheel through said clutch means and manually actuated means engaging said sleeve for shifting the same in an axial direction so as to cause disengagement of said clutching means, whereby the position of said type wheels may be shifted with respect to said ratchet wheel.

33. A truck operation recorder of the class described including time recording type wheels and mileage recording type wheels, a speedometer cable for driving said mileage recording type wheels, electromagnetic means for advancing said time recording type wheels step by step, time controlled means for controlling the operation of said electromagnetic means, printing means for cooperation with said type wheels, an electric motor for actuating said printing means, and control means for said electric motor responsive to the starting and stopping of said speedometer cable for causing a printing operation to take place when the truck starts and stops.

34. A time recorder comprising time responsive driving means, time indicating type wheels controlled thereby, impression means cooperating with said type wheels whereby a printed record may be made, a rotatable driving element, the times of the starting and stopping of which are adapted to be recorded by the cooperation of said impression means with said type wheels, additional time responsive driving means, and tripping means for said impression means responsive to the stopping and starting of said rotatable driving element, said tripping means being actuated alternately by the rotation of said rotatable driving element and by said additional time responsive driving means.

35. In a truck operation recorder, recording mechanism, a reciprocable member having two extreme positions, means for moving said member to one extreme position responsive to movement of the truck, timing mechanism for moving said member to its other extreme position after stopping of the truck, and means controlled by said member at each extreme position for actuating said recording mechanism.

36. In a recording device, a rotatable driving element, a printing mechanism adapted for automatic operation upon the starting and stopping thereof, a rock plate movable from normal position to a displaced position and back to normal position, means for operating said printing mechanism arranged to be actuated by the movement of said rock plate into displaced position and into normal position, means to limit the displacement of said rock plate from its normal position, means between said driving element and said rock plate for operating the latter from normal position into displaced position to cause the operation of said printing mechanism and to cause said rock plate to remain in said displaced position during the continued rotation of said driving element, and means to return said rock plate to its normal position after said driving element has ceased its rotation to cause another operation of said printing mechanism.

37. A device as claimed in claim 36 wherein are provided time delay means for delaying the return movement of said rock plate to normal position under the influence of said return means.

38. Recording mechanism comprising type wheels, a printing hammer for cooperation therewith, a rotatable driving element the starting and stopping of which are to be recorded, and means for operating said printing hammer, said means including an electric circuit, a motor in said circuit operatively connected to said hammer and adapted to operate said hammer when said circuit is closed, a pivoted spring biased member for closing and opening said circuit and operating means between said driving element and said member and responsive to the starting of rotation of said driving element and to the stopping of the rotation thereof for operating said member into circuit closing position to operate said motor.

39. Recording mechanism as claimed in claim 38 wherein are provided means for moving said pivoted member into circuit open position immediately after each printing operation to prevent a second printing operation until subsequent operation of said pivoted member into circuit closing position.

MYRON D. MARKLEY.
JOSEPH M. MARKLEY, JR.

REFERENCES CITED

The following references are of record in the file of this patent:

UNITED STATES PATENTS

| Number | Name | Date |
|---|---|---|
| 726,301 | Huss et al. | Apr. 28, 1903 |
| 1,133,028 | Hill | Mar. 23, 1915 |
| 1,167,566 | Jenkins | Jan. 11, 1916 |
| 1,210,481 | Jennings | Jan. 2, 1917 |
| 1,213,963 | Sines | Jan. 30, 1917 |
| 1,233,637 | Arthur | July 17, 1917 |
| 1,242,483 | Shuster | Oct. 9, 1917 |
| 1,258,803 | Ohmer | Mar. 12, 1918 |
| 1,284,430 | Norton | Nov. 12, 1918 |
| 1,285,049 | Cooney | Nov. 19, 1918 |
| 1,309,204 | Koehler | July 8, 1919 |
| 1,340,324 | Buck | May 18, 1920 |
| 1,360,568 | Ohmer | Nov. 30, 1920 |
| 1,454,493 | Sundh et al. | May 8, 1923 |
| 1,522,874 | Ekman | Jan. 13, 1925 |
| 1,964,409 | Whittaker | June 26, 1934 |
| 2,126,347 | Ruttiman | Aug. 9, 1938 |
| 2,129,362 | Simons et al. | Sept. 6, 1938 |
| 2,129,727 | Harrison | Sept. 13, 1938 |
| 2,159,727 | Markley, Jr. | May 23, 1939 |
| 2,237,137 | Doty | Apr. 1, 1941 |
| 2,237,767 | Schott | Apr. 8, 1941 |